United States Patent
Paciello

(10) Patent No.: US 12,296,266 B2
(45) Date of Patent: May 13, 2025

(54) DIGITAL CHARACTER WITH DYNAMIC INTERACTIVE BEHAVIOR

(71) Applicant: EMOTELOGIC LLC, Santa Monica, CA (US)

(72) Inventor: Keith Paciello, Santa Monica, CA (US)

(73) Assignee: EMOTELOGIC LLC, Santa Monica, CA (US)

( * ) Notice: Subject to any disclaimer, the term of this patent is extended or adjusted under 35 U.S.C. 154(b) by 380 days.

(21) Appl. No.: 17/862,339

(22) Filed: Jul. 11, 2022

(65) Prior Publication Data
US 2023/0009454 A1   Jan. 12, 2023

Related U.S. Application Data

(60) Provisional application No. 63/348,169, filed on Jun. 2, 2022, provisional application No. 63/220,909, filed on Jul. 12, 2021.

(51) Int. Cl.
*A63F 13/57*   (2014.01)
*A63F 13/53*   (2014.01)
*A63F 13/55*   (2014.01)

(52) U.S. Cl.
CPC .............. *A63F 13/57* (2014.09); *A63F 13/53* (2014.09); *A63F 13/55* (2014.09)

(58) Field of Classification Search
CPC .......... A63F 13/57; A63F 13/53; A63F 13/55; A63F 13/56; A63F 13/58; A63F 2300/65
USPC .......................................................... 463/31
See application file for complete search history.

(56) References Cited

U.S. PATENT DOCUMENTS

| | | | |
|---|---|---|---|
| 9,727,798 B2 * | 8/2017 | Caldwell | G06V 10/462 |
| 10,147,146 B2 * | 12/2018 | Merrifield | G06F 11/3438 |
| 10,706,347 B2 * | 7/2020 | Garcia | G06N 5/02 |
| 11,620,781 B1 * | 4/2023 | Kleanthous | A63F 13/60 |
| | | | 345/473 |
| 2013/0257877 A1 | 10/2013 | Davis | |
| 2018/0342095 A1 | 11/2018 | Walsh | |
| 2020/0193264 A1 | 6/2020 | Zavesky et al. | |

FOREIGN PATENT DOCUMENTS

| WO | WO 2017/019530 A1 | 2/2017 |
|---|---|---|
| WO | WO 2019/236276 A1 | 12/2019 |
| WO | WO 2020/247590 A1 | 12/2020 |

OTHER PUBLICATIONS

PCT International Search Report and Written Opinion, PCT Application No. PCT/US2022/036743, Dec. 5, 2022, 16 pages.

* cited by examiner

*Primary Examiner* — Allen Chan
(74) *Attorney, Agent, or Firm* — Fenwick & West LLP

(57) ABSTRACT

A virtual experience system provides dynamically interactive virtual characters in an environment. The system may be built in a modular fashion, enabling new behaviors and functionality to be added without significant alterations to the existing parts of the system. For example, behavior may be modeled using a model with multiple layers. Each layer determines responses to external stimuli based on one or more factors, with the behavior of a character being determined based on a combination of the layers of the model.

20 Claims, 26 Drawing Sheets

DIGITAL CHARACTER WITH DYNAMIC INTERACTIVE BEHAVIOR

CROSS REFERENCE TO RELATED APPLICATIONS

This application claims the benefit of U.S. Provisional Patent Application No. 63/220,909 entitled "Animation System and Method," filed Jul. 12, 2021, and U.S. Provisional Patent Application No. 63/348,169 entitled "Virtual Character with Dynamic Interactive Behavior," filed Jun. 2, 2022, both of which are incorporated by reference.

BACKGROUND

1. Technical Field

This disclosure relates generally to digital characters and, in particular, to creating organic emotive interactions and behaviors.

2. Problem

Various types of characters are used in a wide range of applications. In video games, virtual characters are animated and interact with a variety of different characters and game environments. In movies and television, animated characters appear in both fully animated scenes as well as hybrid scenes that include live action footage with computer-generated image (CGI) objects and characters composited together. In business, customer services are provided by digital and synthetic agents or assistants. In robotics, the behavior of interactive robots may be driven by a character model. Furthermore, the range of use cases for digital characters continues to expand.

Each use case has its own requirements and demands, but there are certain limitations to existing technologies that apply to most if not all use cases. For example, providing realistic responses to external stimuli plays a large part in making an individual character believable. Existing approaches typically rely on a human (e.g., a programmer and/or an animator) to individually define a character's response to each stimulus. This is incredibly time consuming and subject to the personal preferences and biases of the human, leading to differences in response for the same character depending on the human that defined the response. Furthermore, individual characters constructed in this way cannot scale efficiently, let alone allow for the creation of characters with individualized personalities, nonverbal body cues and speech for which a response has not been defined.

DETAILED DESCRIPTION

Figure 1:
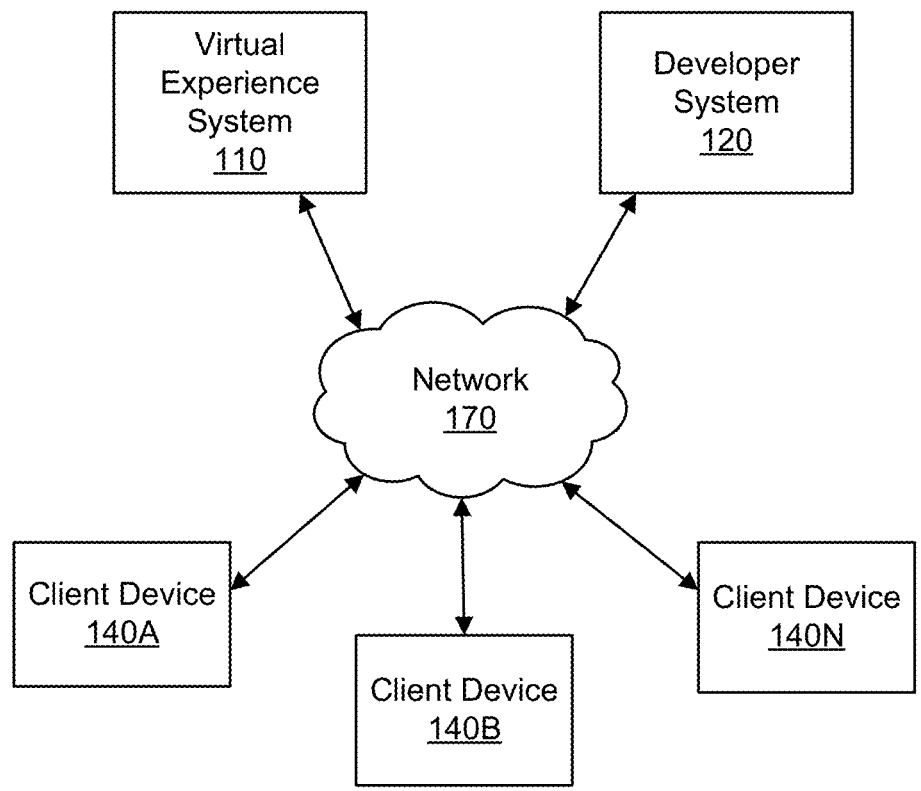
FIG. 1 is a block diagram of a networked computing environment suitable for providing a character with dynamic interactive behavior, according to one embodiment.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Overview

A virtual experience system provides dynamically interactive characters in an environment. As the digital world is rapidly evolving, names such as Digital Being and Virtual Being have often been used interchangeably. In this disclosure, the term character is used broadly to refer to any digital virtual, robotic, or synthetic being as well as any other character that is driven by software or firmware, such as digital humans, avatars, player characters (PCs), non-player characters (NPCs), digital twins, virtual humans, virtual assistants, virtual influencers, synthetic characters, deep fakes, holograms, anthropomorphic characters, robotic characters, and agents used in commercial/informational contexts etc. The system may be built in a modular fashion, enabling new behaviors and functionality to be added without significant alterations to the existing parts of the system. For example, behavior may be modeled using a model with multiple layers. Each layer determines responses to external stimuli based on one or more factors, with the behavior of a character being determined based on a combination of the layers of the model. Furthermore, the modular nature of the system enables user to select configurations that are an minimal or deep as desired, and to easily and quickly modify or replace behavior models for characters.

The use of layers allows for the creation and delivery of nuanced interactions with or between characters at scale for real time or pre-rendered productions. In some embodiments, the system includes a real time production tool that provides a user with full access to the layered system, animation assets, and in-engine design structure allowing for real time scalable systemic emotional character personalities and interactions. Additionally or alternatively, the system may be used to provide agents in commercial or educational contexts (e.g., digital concierges or tutors) and drive the behavior of interactive robots. The system also may include the ability to interact with various API's such as Chatbots, Synthetic Voice, Computer Vision, etc. so that the corresponding functionality can also be driven and sculpted in real time.

In some embodiments, the system includes artificial intelligence (AI) (e.g., machine learning, neural networks, etc.) that provides recommender systems to identify situations, individual users, and users' individualized needs. The system may then adapt and react accordingly, as well as including the ability of setting mood of the surrounding environment for maximum comfort level of the user (i.e., lighting, color scheme, environment, soundscape, music, etc.).

The system may include or all of the following elements: emotion design, personas, a character class system, a stat system, skill trees, character customization, game states, data structures, arrays (e.g., an array of emotions), modifiers, status changing effects, branch points, savable presets, tags, triggers, events, macros, functions (e.g., sub-steps, subfunctions, variables, animation systems, animations, character UIs, modular architecture components, animation notify events, target points, a dialogue system, synthetic voices, etc.), schemas, blends, and the like. In some embodiments, the system provides direct or indirect control of these elements to define the overall behavior of the characters.

Alternatively, in some embodiments, the system may be used as an animation tool and/or plugin running in a 3D software package (i.e., Maya) and/or a plugin/system/toolkit/framework inside a game engine (i.e., Unreal Engine) that may layer assets together allowing for a multitude of variations in real time. The use of a layered, modular system can provide ease of use as well as increased speed and output of production. The system may also enable the creation of natural organic emotive interactions and performances through virtual individualized embodied conversational agents at scale.

Example Layered Behavior System

In some embodiments, a layered behavior system allows for systemic nuanced performances by characters at scale for pre-rendered and real time productions. For pre-rendered scenarios in 3D Animation Software Packages, the foundational base layers of the system are used as an Animation Tool which allows quicker production value. When the system is integrated into a game or other real time environment, the users may receive full access to the layered system and to the engine design structure allowing for real time scalable systemic emotional character interactions. Using personality layers, a character may be defined with some initial parameters and provide a nuanced performance throughout a game, scene, or movie without the user individually defining the character's response to each event or stimulus.

In some embodiments, the system includes novel additive layers that allow for real time adjustments and tweaks on a granular level to the assets within each layer and each of the layer's subset values. This in turn allows for a wide variety of variations being called out in real time (which is not possible when using traditional individual full body animations systems). This granular control allows for the possibility of scalable individualized emotive personalities and interactive performances by characters.

Thus, the system may enable the creation of wide ranges of individualized emotional systemic performances at scale for both pre-rendered and real time processes for entertainment and customer services. In addition, the system allows for the scalable production of individualized emotional performances more efficiently in both time and cost.

In some embodiments, assets are created for 3D packages, allowing for animations to be dragged and dropped into layers to create nuanced emotive performances in minutes rather than days or weeks in 3D software packages for shorts, commercials, TV, Film, and other uses.

In other embodiments, assets are created for Game Engines, wherein Individualized Emotional Interactions and Performances can be called upon and changed in real time through the power of the Layered System call outs and class systems that allow for the creation of specific needs per each character.

In some embodiments, the system includes software that runs on a controller, including, e.g., a desktop computer, a laptop, a mobile phone, a cloud server, other types of controllers, and any combinations thereof. The controller may be an internal or external controller for a robot. In some embodiments, the controller may include a plurality of networked controllers. In some embodiments, the system includes a cloud platform comprising one or more servers that may include Internet servers, LAN servers, WAN servers, or other types or combinations of types of generally networked servers. The cloud platform may include central processing units (CPUs), microprocessors, microcontrollers, memory, databases, storage, operating systems, software and other components and systems that may be required to run, manage, deploy, and otherwise operate and control the programs and applications that may run within the system. Some information and/or assets may be stored in a distributed database or ledger (e.g., on a blockchain).

Potential users of the system include entities that create digital productions and entertainment that wish to include emotive performances by characters. For example, users may include entertainment companies, previsualization companies, animation studios, game studios, software companies, marketing, advertising, commercial, social media, virtual influencers, customer service companies, personal users, education, healthcare, or other types of users.

FIG. 1 illustrates one embodiment of a networked computing environment 100 suitable for providing a character with dynamic interactive behavior. In the embodiment shown, the networked computing environment includes a virtual experience system 110, a developer system 120, and client devices 140, all connected via network 170. It should be appreciated that this configuration is an example and many of the principles described below may be implemented in other configurations, including non-networked configurations. For example, the virtual experience system 110 may be part of an animation system that is installed on an computer, which may or may not be connected to a network 170. Conversely, in an embodiment where the character is a customer support agent (e.g., at a car dealership), customers may connect to a server that includes the virtual experience system 110 via a client device to interact with the agent and developers may periodically upload updates to the agent from the developer system 120. In yet other embodiments, the networked computing environment 100 includes different or additional elements. In addition, the functions may be distributed among the elements in a different manner than described.

The virtual experience system 110 provides one or more characters and determines how those characters interact with an environment. The environment may be a virtual environment managed by the virtual experience system 110 (e.g., in the case of a character that is part of a video game) or a physical environment (e.g., in the case of a customer support agent at a retail or service location). A character dynamically responds to external stimuli based on factors including: demographic factors (age, gender identity, ethnicity, sexual orientation, etc.), a personality model of the character, an emotional state of the character, the nature of the environment (e.g., size, lighting level, noise levels, type of location, etc.), proximity of other characters (and relationships between those characters and the character), and the like. Various embodiments of the virtual experience system are described in greater detail below, with reference to FIGS. 2 through 29.

The developer system 120 is one or more computing devices with which a human may update virtual environments, characters, or both. For example, the developer system 120 may present a user interface with which a human can set values for various personality metrics for a character (e.g., by typing in values, moving a slider, or selecting a position on a 2D plot, etc.). The developer system 120 may also provide a test environment in which the human can see how the character responds to various stimuli and make adjustments to the character accordingly. As another example, the developer system 120 may enable a human to build or modify a virtual environment and place one or more characters in that environment for testing. Furthermore, the developer system 120 may enable the human to script events within the virtual environment, such as characters or objects entering or leaving the environment at predetermined times, an explosion occurring if a condition is met (e.g., a character stepping on a pressure plate), light turning off or on at a predetermined time after a character enters the environment, etc.

The developer system 120 may provide a GUI (e.g., a systemic animation layered tool) that enables a user to select assets from individual layers and position them on a timeline to create one or more performances. The GUI may include visual sliders or other controls to create customizable emoting humans. In this way, each layer allows custom tailoring and modifications to be made as desired. In some embodiments, a developer may determine a desired emotion for a character, and then add assets to the character from various layers to create the desired emotional response. In some embodiments, customized performance settings may be saved to be called out as presets later on demand.

The client devices 140 are computing devices with which end users may interact with the virtual experience system 110 to view or interact with characters. For example, in a gaming embodiment, the client devices 140 can be gaming consoles that execute a game including a virtual environment and character provided remotely (e.g., via the internet) by the virtual experience system 110. As another example, in a retail services embodiment, customers at a car dealership may connect to the virtual experience system 110 using an app on a smartphone to interact with a service agent and get information about available vehicles. Although three client devices 140A, 140B, and 140N are shown in FIG. 1, in practice, the networked computing environment 100 can include any number of client devices 140.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Example Virtual Experience System

Figure 2:
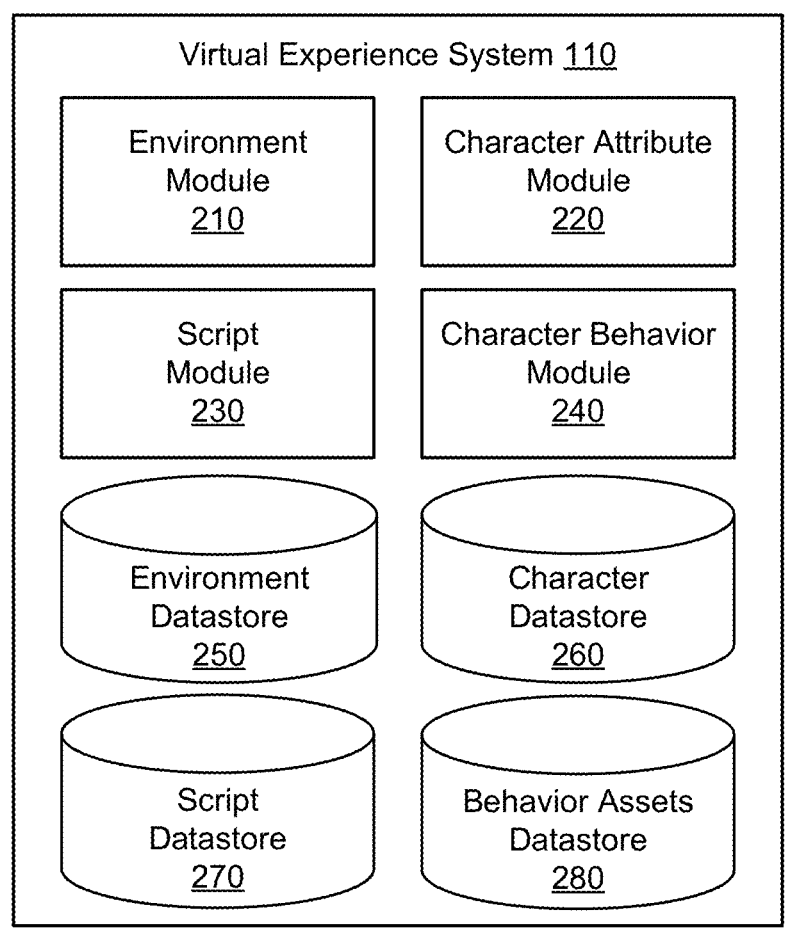
FIG. 2 is a block diagram of the virtual experience system of FIG. 1, according to one embodiment.

FIG. 2 is a block diagram of one embodiment of a virtual experience system 110 that generates virtual experiences including one or more characters. The virtual experience can be a pre-rendered scene in which a character interacts with an environment or other characters. Alternatively, the virtual experience can be interactive. For example, a user may interact with a character in a game or an assistant to complete one or more tasks.

In the embodiment shown in FIG. 2, the virtual experience system 110 includes an environment module 210, a character attribute module 220, a script module 230, a character behavior module 240, an environment datastore 250, a character datastore 260, a script datastore 270, and an assets datastore 280. In other embodiments, the virtual experience system 110 includes different or additional elements. In addition, the functions may be distributed among the elements in a different manner than described.

The environment module 210 manages a virtual environment in which one or more characters reside. The environment may be entirely virtual (e.g., a video game environment) or an augmented reality environment in which the coordinate space of the virtual environment maps to at least a portion of the real world (e.g., an assistant in a car dealership may be experienced at or near each display vehicle that is available for sale). The environment may also include one or more virtual objects, such as furniture, plants, weapons, vehicles, and the like.

The environment module 210 may evolve the environment over time according to one or more rules. For example, the light level and color spectrum for an outdoor environment may change over time from day to night and back again in a repeating cycle. A developer may define the periodicity of variations (e.g., using a under interface provided by the developer system 120) to provide variations in the environment over different length scales. Note that the term developer is used to refer to software developers, animators, game designers, or any other human who defines aspects of the environment or characters.

The character attribute module 220 maintains behavioral models for characters. A behavioral model includes values for various attributes of the corresponding character. The value for any given attribute may be binary (e.g., "is outgoing" or "is not outgoing") or a value on a scale (e.g., "70% introverted"). Examples of numerous attributes that may be assigned to characters are given later in this disclosure. The behavioral model for a character need not be static. It may evolve over time according to a script (e.g., a character may become more outgoing as they progress through a story), dynamically in response to events (e.g., a character in a game may become more confident if they succeed in game tasks or less confident if they fail game tasks), or both.

The script module 230 causes updates to the environment or characters according to predetermined rules provided by a developer. In one embodiment, the script module 230 may trigger events in the virtual environment based on triggers. Triggers may be time stamps (e.g., a certain character enters the environment after a certain amount of time has passed from a scene start time) or tied to other actions in the environment. For example, in a video game, certain characters or objects may enter/leave the environment in response to other actions (e.g., a rabbit may run out of the environment on noise above a threshold volume being generated) or events may occur based on proximity of an object or character (e.g., a landmine may explode if a character moves within a specified distance of the landmine, or a dialogue may be initiated if two characters enter within a certain proximity of each other). In each case, the system may dynamically generate a nuanced response to the event by the character that depends on contextual information, such as the character's emotional state, proximity and relationship to other characters, energy level, and the like. Thus, the same scripted event may generate vastly different responses depending on the current contextual information.

Additionally or alternatively, the script module 230 may trigger updates in the behavioral model for a character. For example, as a character advances through scenes of a movie or levels of a game, certain aspects of their personality may change (e.g., a character may slowly evolve from being sad to being happy, or the character may slowly evolve from being introverted to being extroverted, etc.). As another example, the demeanor of a character may change dynamically in response to events. If the character is successful in completing tasks of a certain type, their overall confidence may increase and their demeanor may automatically and dynamically be updated when performing similar tasks in future (e.g., their posture may become more upright and they may smile more, etc.). Conversely, if a character fails in a task, their confidence when performing that type of task may decrease and their demeanor be dynamically adjusted accordingly.

The character behavior module 240 determines how characters behave. The behavior of a character may include scripted behavior (including idle behavior), which may be impacted dynamically by external stimuli. In one embodiment, the character behavior module 240 applies the behavior model for a character to identify and retrieve (e.g., from the assets datastore 280) available assets for the character. Which assets are available may depend on multiple factors in the behavioral model as well as aspects of the environment (e.g., some assets may be available only at night, only if outdoors, etc.). The assets are instructions for implementing possible behaviors of the character, such as gestures, dialogue choices, poses, posture, eye movements, weight shifts, gaits, dance moves, etc.

The assets may be tagged with one or more conditions to be met to make that asset available. An asset may be available for characters with a certain attribute or attribute value within a range (e.g., an antiquated phrase may be available to characters over a certain age, a gesture may be available to characters with the "outgoing" trait, a hand gesture may be available or substituted for another hand gesture when speaking a certain language, or a pose or posture may be available to characters in a "scared" emotional state, etc.). In some cases, an asset is available if a character meets any one of the conditions the asset is tagged with. In other cases, a character must have all of the indicated attributes (e.g., a hand gesture may be available only to members of a specific character class of a specific culture that have exceeded a specified character level in a game). Where the availability of an asset is based on the value of a parameter exceeding or being below a threshold, a random variation in the threshold (e.g., plus or minus ten percent or the addition of a Gaussian noise parameter) may be introduced to provide an additional source of variation, thus increasing the organic variability of performances.

Assets that are available may also be tagged with probabilities of being used by the character. The probabilities may be fixed (e.g., a given pointing gesture is selected forty percent of the time when the character points at something) or may be dependent on attributes in the character model (e.g., a gesture or phrase typically used by young characters may have an eighty percent probability of being selected by characters under eighteen years of age with that probability dropping by two percent for each year over eighteen the character is). Thus, which assets trigger for a character at any given time may be determined by first identifying available assets of the desired type and then using a random number generator to select from among the available assets according to the assigned probabilities. Furthermore, the probability of an asset triggering may be adjusted by more than one layer or aspect of the behavioral model.

Additionally or alternatively, the probability of an asset triggering may be based on the degree to which the character is experiencing a corresponding emotion. For example, if the character is only mildly sad, then a gesture correlated with sadness may trigger with a min/max value between 10 and 20 seconds, whereas if the character is absolutely devastated and emotionally wrecked, the gesture may trigger with a min/max value between 60 and 80 seconds (or more), making the character movements quiet if not almost still, reflecting the extreme level of sadness. This randomized time frequency triggering of assets based on emotions when applied to the gesture layer (and/or another layer) can further define character models and provide nuanced representations of the character's overall mood and emotion. This may be further impacted by attributes such as the degree of introversion/extroversion, energy level, age, dance, and the like. For example, a character with a higher energy level may have more frequent assets triggered per layer over time, leading to them moving more, whereas c character with a low energy level may have less assets triggered per layer over time, leading to them moving less.

As another example, when dancing, a randomized min/max timer can be set for how long a body layer stays on the different time signatures selected. If the character is moving to a rhythm, such as four on the floor or moving to 3/4, 2/4 or 1/4, etc., the timer can control how long the character stays in each time signature. The selection of time signatures as well as a randomized length of time on each time signature can thus change the overall feel of the dance and the mood. Layers and body parts can each have their own randomized time frequency trigger and can be activated and adjusted as desired. The combination of categorizing assets per layer on a granular level with multi tags and setting how randomly those assets can be chosen in combination with how often they are triggered once chosen allows for a large amount of behavioral variation at scale.

In addition to the probability of an asset triggering, the asset may also be amplified or suppressed by aspects of the behavioral model. For example, an extroverted character may perform a gesture with greater exuberance (i.e., with greater amplitude) than an introverted character. This may be further modified by a current excitement level or other mood of the character. Thus, a wide range of behaviors may be dynamically exhibited from a single asset based on the current state of the character.

It should be appreciated that this approach gives developers a wide range of options for adding assets in a modular fashion by adding them to the assets datastore 280, adding one or more tags that are required for the asset to be available, and setting a probability that the asset will trigger if available. Various embodiments of the character behavior module 240 are described in greater detail below with reference to FIG. 12.

The environment datastore 250 includes one or more computer readable media that store the data defining one or more environments used by the virtual experience system 110. Each environment may be identified by an environment identifier (e.g., a unique identification number or string). In one embodiment, an environment is defined by a polygon mesh and textures for a scene as well as any objects within the scene. The environment datastore 250 may also include audio assets for an environment, such as background noise, music, and sound effects for the environment. However, any suitable approach to representing an environment in which characters can be placed may be used.

The character datastore 260 includes one or more computer readable media that store the character model for one or more characters. As described previously, a character model can include values for a potentially large number of attributes, some of which may be binary (the character does or does not have the attributes) and other of which are a value in a spectrum. A character's behavioral model can be stored as a data object indexed with a unique identifier of the character (e.g., a name or character ID).

Figure 3:
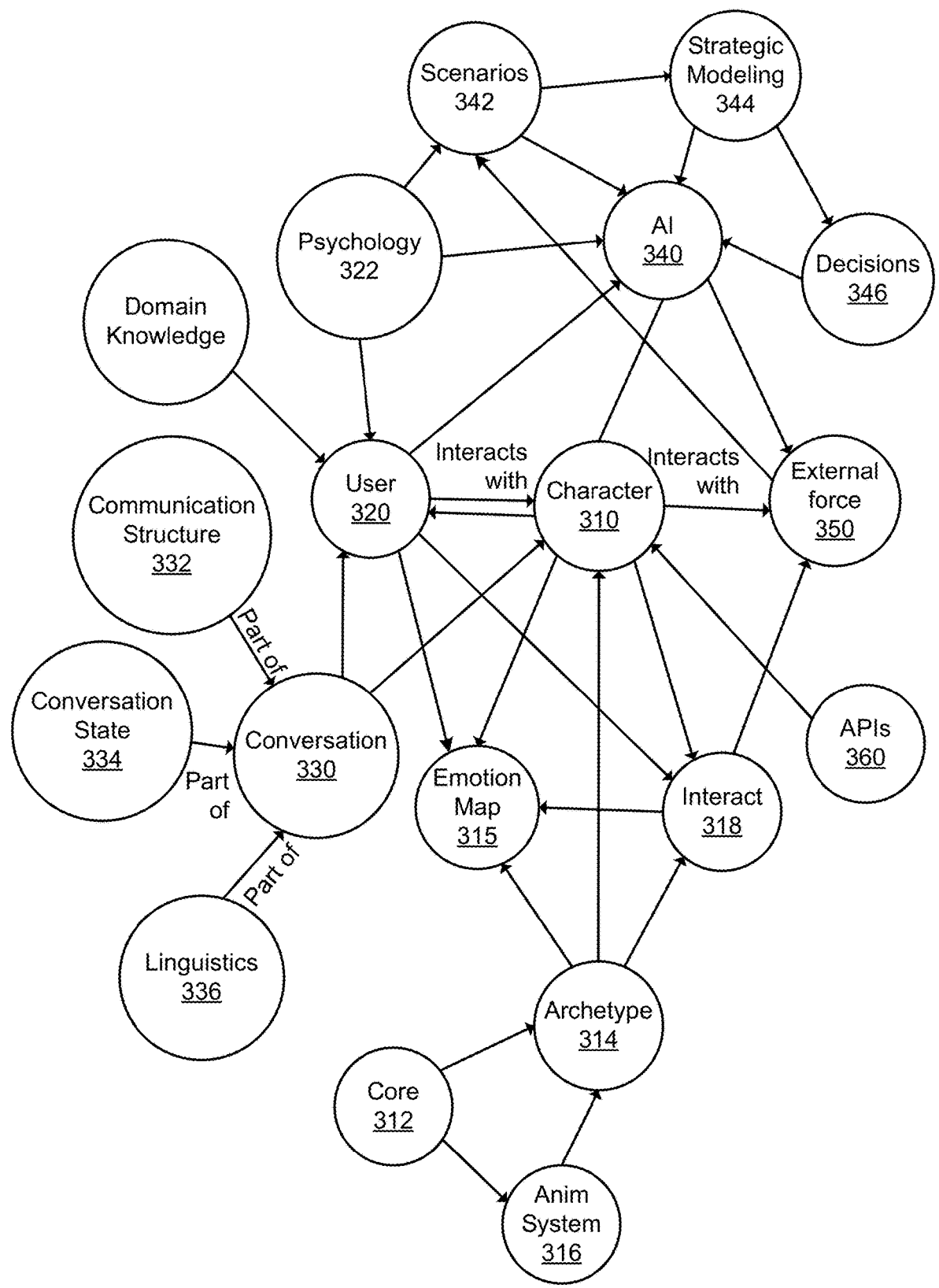
FIG. 3 is a conceptual diagram of a behavioral model for a character, according to one embodiment.

FIG. 3 illustrates how an example character model may fit into the system. In the embodiment shown, the character model includes a representation of the character 310. The character representation 310 identifies attributes such as an archetype, personality type, personality traits, temperament, mood, emotion, conversational state, interaction style, and relationship to the user. The character model can interact with a core model 312, an archetype model 314, and an emotion map 315. The core model 312 and archetype model 314 may interact with an animation system 316.

The core model 312 can include attributes such as common attributes (attributes held by all characters), energy level, introversion/extroversion, age, gender identity, ethnicity, culture, and the like. One embodiment of the core model 312 is described in greater detail below with reference to FIGS. 5 through 17.

Figure 4:
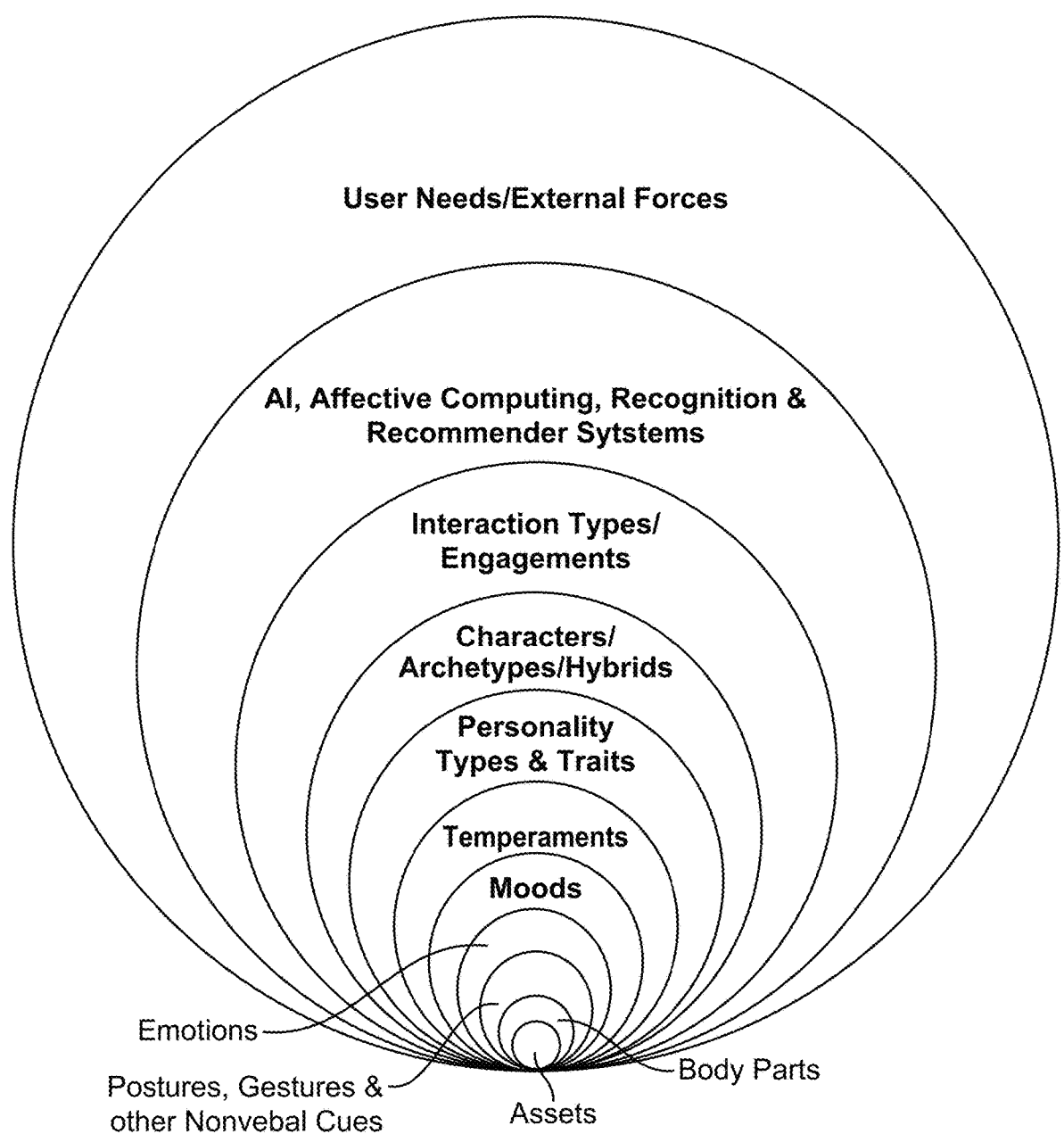
FIG. 4 illustrates the creation of scalable individualistic embodied conversational agents, according to one embodiment.

The archetype model 314 can include attributes of the character's personality, from a selected archetype list such as masculinity, femininity, ego type, soul type, self type, a yearning for paradise, a desire to leave a mark on the world, a desire to connect with others, a need to provide structure, etc. These attributes may be binary values or positions on a spectrum. A developer (either in-house or third party, where allowed) may use a developer system 120 to create or modify character archetypes. FIG. 4 illustrates a model with which character archetypes can be designed for various purposes. The model includes consideration of interaction types/engagements, characters/archetypes/hybrids, personality types and traits, temperaments, moods, emotions, postures, gestures and other non-verbal cues, body parts, and other assets. For example, the developer can select assets that are available for the archetype (and optionally probabilities that each asset will trigger for the archetype) that are then tagged in behavior assets datastore 280 with an identifier of the archetype. The model is allied to contextual information provided by other parts of the system, such as user needs, AI, affective computing, recognition, and recommender systems. The character model may also account for how the character 310 interacts 318 with others, such as an engagement type, interaction style, personality, and communication style.

The emotional map 315 represents the range of emotion the current character can have as well as points to the current emotional state of that particular character. In one embodiment, characters within the system live in moods, and based on interaction types, emotions are triggered by the system accordingly. These interjected emotions allow branching points that may transition into a different or new mood, or remain within the current mood.

Moods are generalized mental states that are not tied to a specific incident, but a collection of inputs. A character's mood may be influenced by several factors: the environment (weather, lighting, people around the character, etc.), physiology (what the character has been eating, whether they've been exercising, how healthy they are, etc.), and mental state (where the character is focusing attention and their current emotions). Moods can last minutes, hours, or even days. Based on interaction types, moods can trigger emotions. There are degrees to emotions, i.e., how much of an emotion someone is feeling, so when modeling emotions for characters, each emotion can be represented by a metric indicating how intensely (if at all, the character is currently experiencing that emotion).

Interjected emotions enable branching points which transition emotions into feelings. Feelings happen as an individual begins to integrate an emotion. That is, to think about the emotion and "let it soak in." A "feeling," is something an individual senses. Feelings are more "cognitively saturated" as the emotion chemicals are processed in the individual's brain and body. Feelings are often fueled by a mix of emotions, and last longer than emotions. Feelings can dictate if a character transitions into a different/new mood or remains in the same mood it was coming from.

In some embodiments, the system uses machine learning to gather and analyze data (e.g., natural language data, music, video of a sporting event, etc.), to categorize and set up rule sets for various emotional responses, and to automatically recommend (deliver) required assets depending on the received information in real time. In this way, the system may connect specific animation assets to linguistic structures. In some embodiments, the set up may include customizable emotions, individualized personalities, or interaction styles.

In some embodiments, the process may include emotion recognition, moods and emotions (e.g., agents can be set to moods), character development, conversational arcs, interactions based on a user's needs (e.g., interaction styles, temperament types, play to personality types, and disabilities (e.g., Autism, a developmental disorder that can cause significant social, communication and behavioral challenges). In addition, the process also may include piggybacking off of rules and structures used by linguistics, NLP, NLU, data analysis, or sentiment analysis.

Figure 5A:
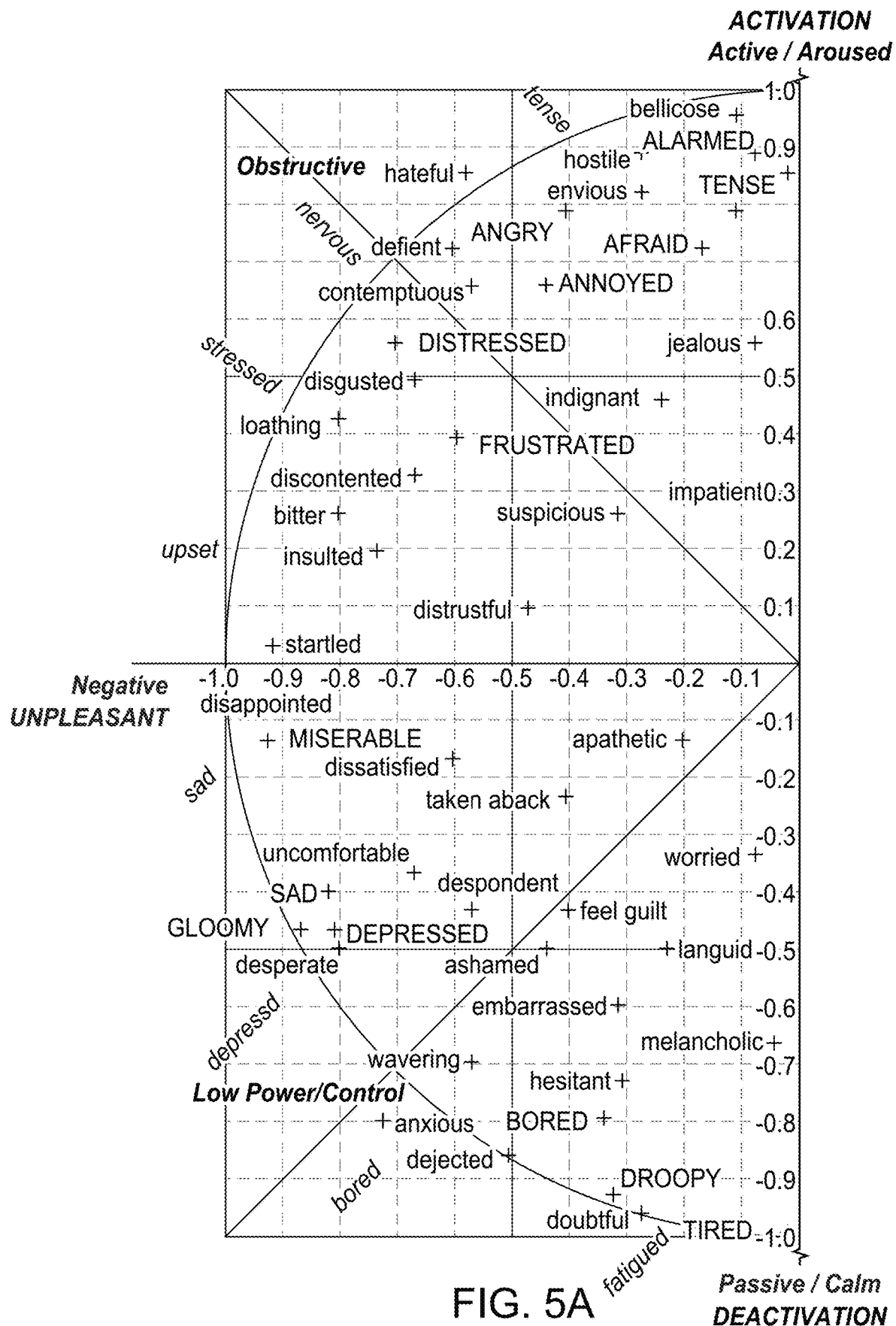
FIGS. 5A and 5B show a conceptual diagram illustrating the representation of emotions on a two-dimensional (2D) plane, according to one embodiment.
Figure 5B:
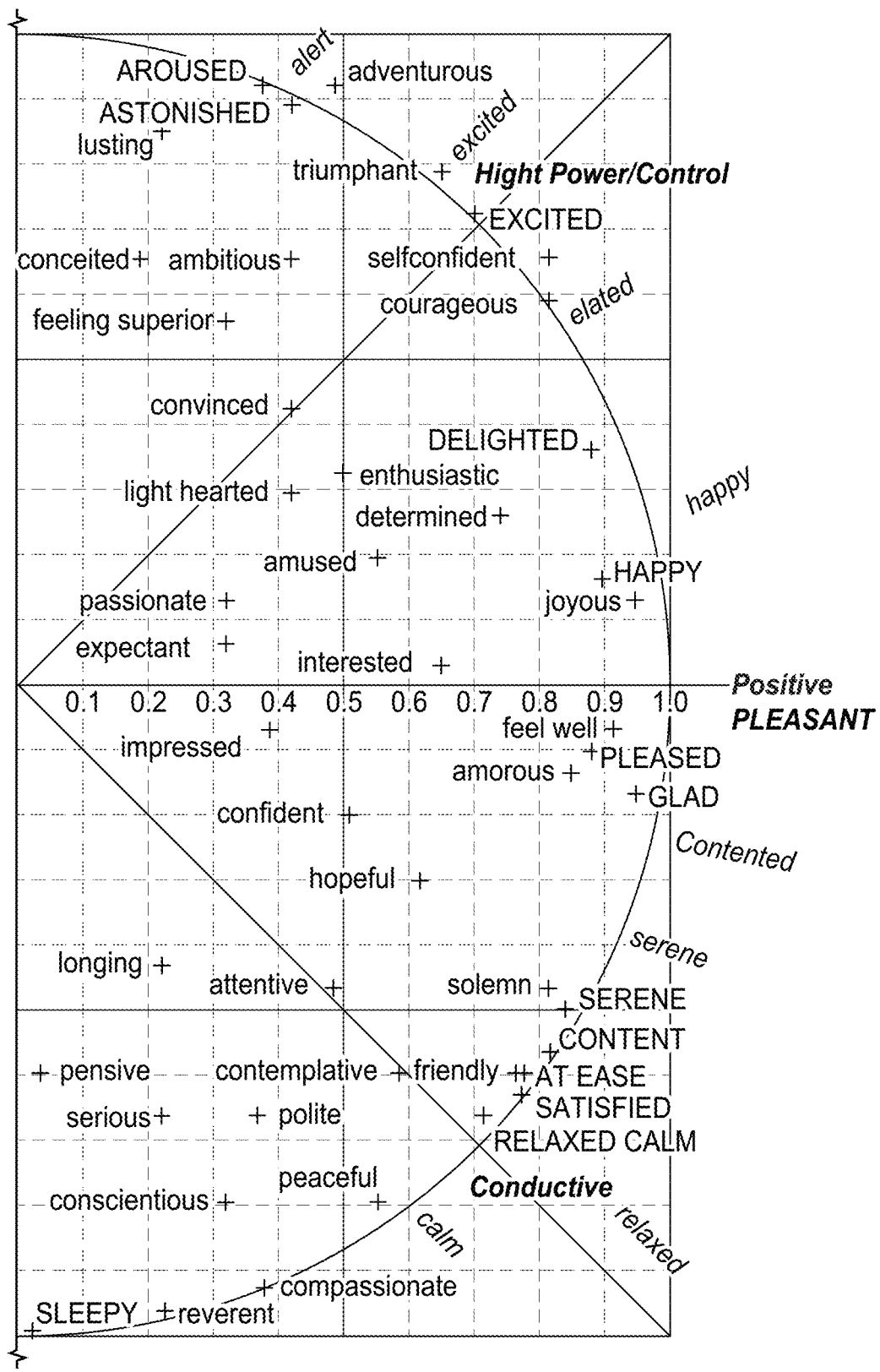

FIGS. 5A and 5B illustrate the representation of emotions as coordinates on a 2D plane. Using these types of maps may enable more accurate plotting and prediction of where the mood/emotion of a character may move next absent an extreme event. Furthermore, a 2D plane such as this may be presented to a developer to enable intuitive selection of emotions for a character. The determined emotions and moods can be overlaid on other behavioral metrics to influence character behavior.

Figure 6:
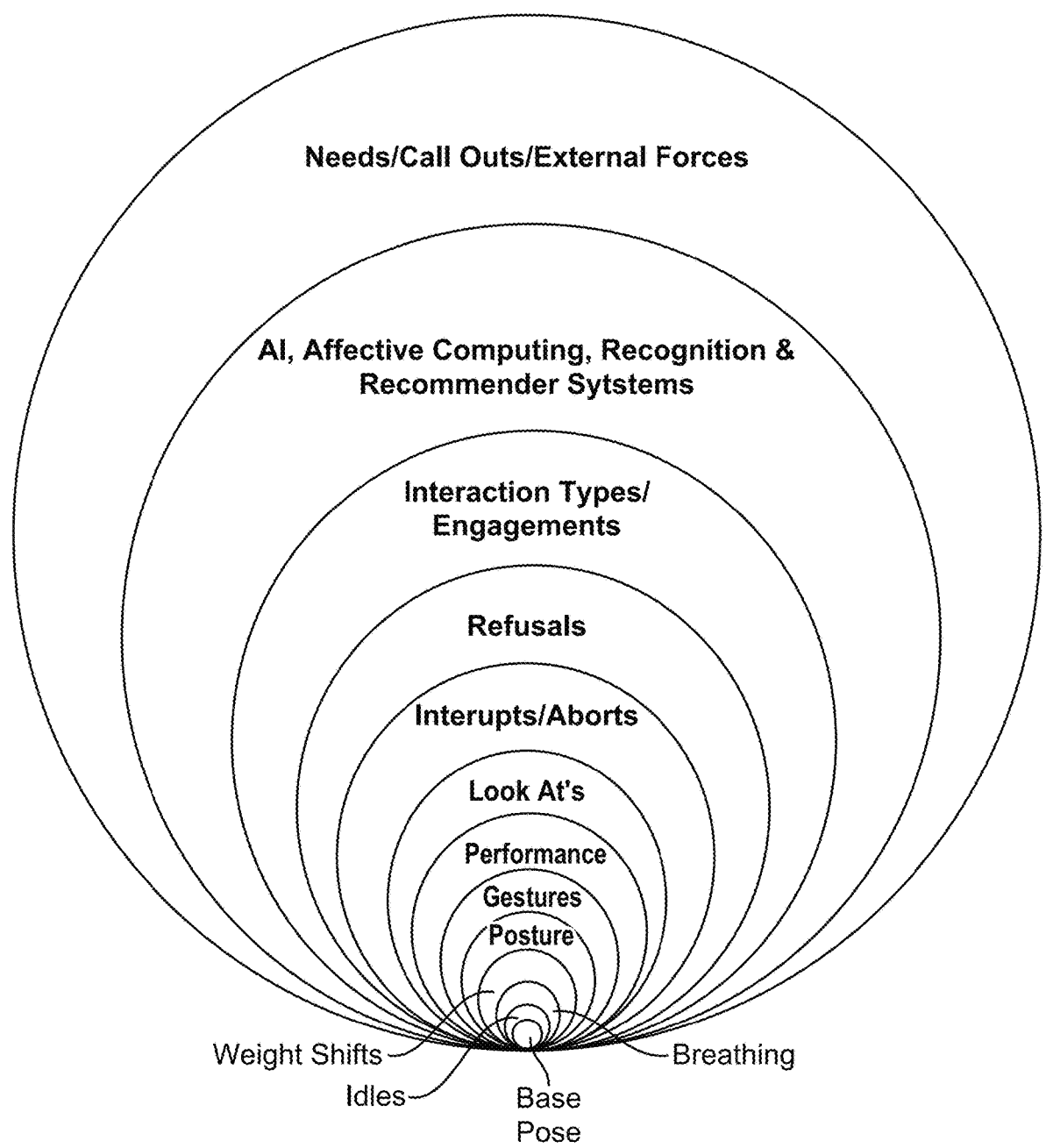
FIG. 6 illustrates a set of character animation layer groups for creating granular animated systemic performances, according to one embodiment.

The animation system 316 generates visualizations by layering various assets/behaviors, such as idles, breathing, weight shifts, postures, gestures, mannerisms, performances, looks-ats, interrupts, and refusals, etc. FIG. 6 illustrates one embodiment of a set of character animation layers. Specifically, FIG. 6 illustrates a high-level overview of the macro to micro and/or micro to macro breakdown for creating granular animated systemic performances. This may include base pose, idles, breathing, weight shifts, posture, gestures, performance, look ats, interrupts, refusals, and interaction type/engagements, all of which are evaluated according to contextual information (e.g., as provided by Artificial Intelligence (AI), and/or needs/call outs/external forces).

Figure 7:
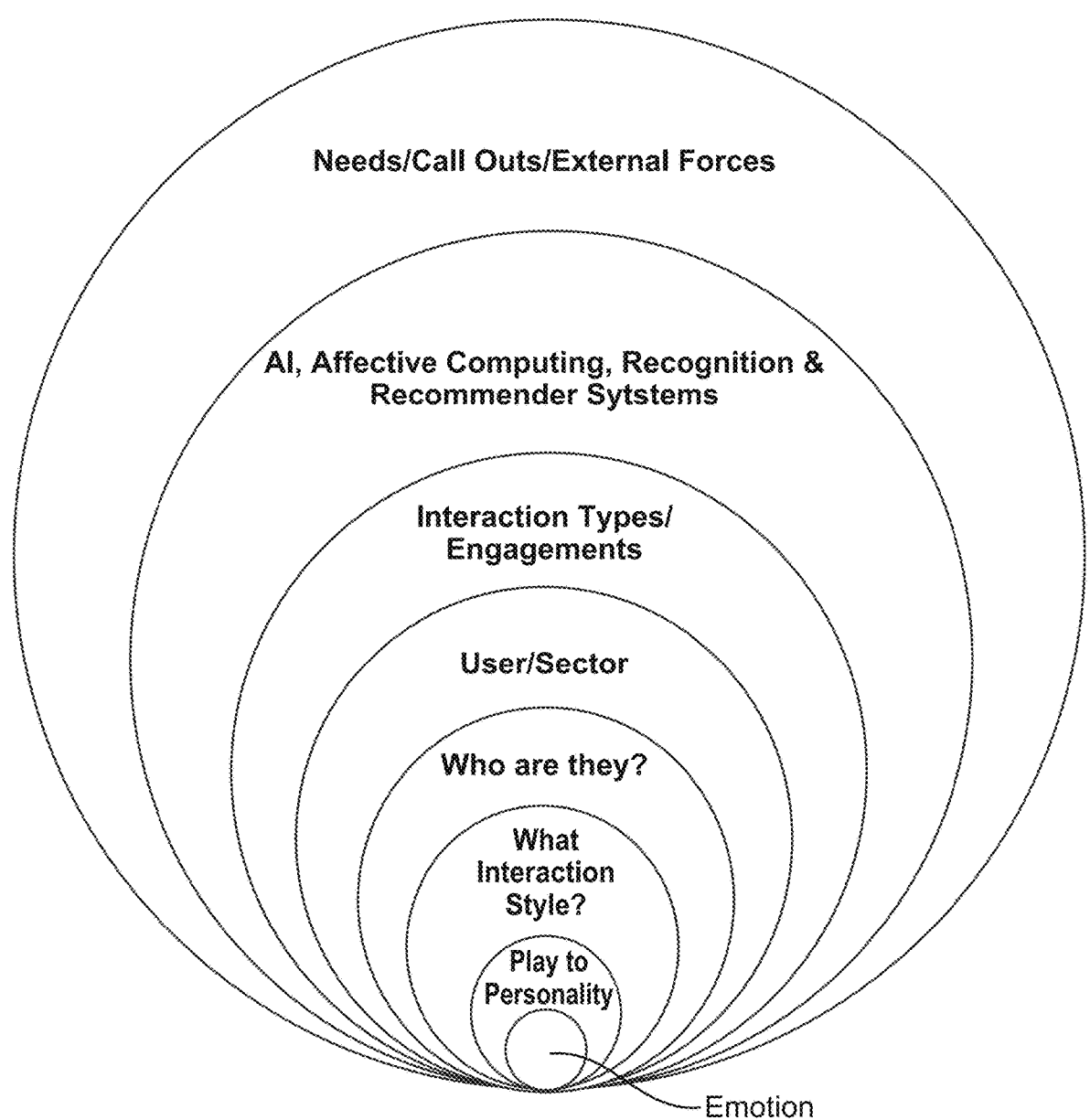
FIG. 7 illustrates an example model of who a user is, according to one embodiment.

The character model may also include or interact with a representation of the user 320 indicating the relationship between the character and the user. For example, the user representation 320 can indicate a sector/domain and type of customer in an embodiment where the character is an agent. More generally, the user representation 320 can indicate the user's personality, preferred communication style, interests, and the like. FIG. 7 illustrates an example model of a user, according to one embodiment. Specifically, FIG. 7 illustrates a high-level overview of the macro to micro and/or micro to macro breakdown of who the user is on a granular level allowing the ability to assign tags representing attributes of the user to enable provision of granular responses. The model of the user may include interaction types/engagement; user/sector information; information about who the user is; the user's interaction style; playing to the user's personality; and playing to a user's emotions, all evaluated according to contextual information provided by user needs/callouts/external forces; AI, affective computing, recognition, and/or recommender systems.

The character model may include a representation of the character's current conversation 330, which includes communication structure 332, conversation state 334, and linguistics 336. The conversation structure 332 can include values for how high impact the conversation is, whether it is productive, the speech style being used, the type, stage, phase, and elements of conversation, and the like. The conversation state 334 indicates the character's current status in the conversation, such as idle, listening, speaking, acknowledging, being interrupted, interrupting another character, etc. The linguistics 336 include the context, semantics, syntax, morphology, phonology, and phonetics of the conversation.

Figure 8:
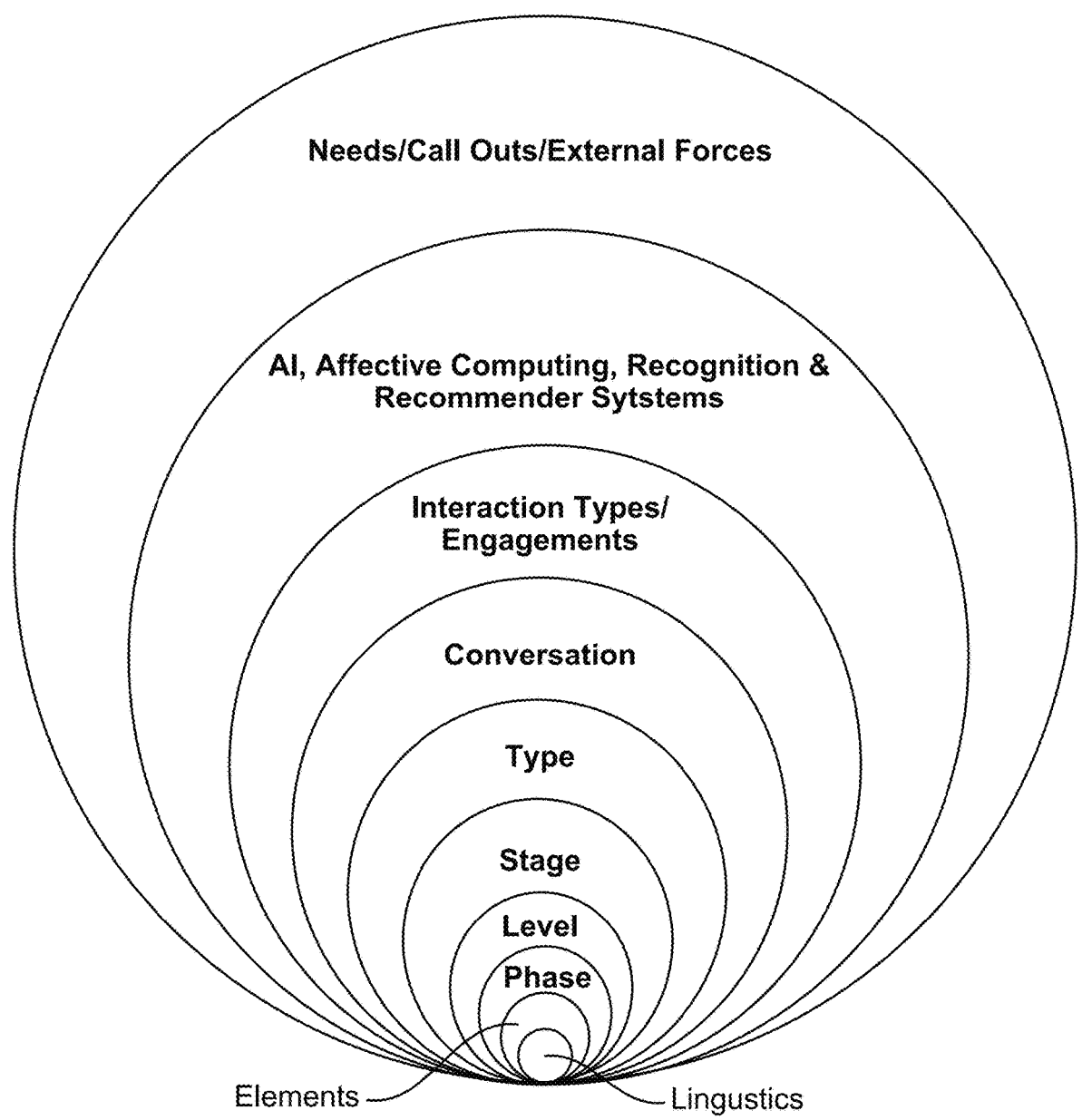
FIG. 8 illustrates a model of conversation structure, according to one embodiment.

FIG. 8 illustrates a model of conversation structure, according to one embodiment. Specifically, FIG. 8 illustrates a high-level overview of the macro to micro and/or micro to macro breakdown of conversation structure in order to tag performances on a granular level. This may include conversation, type, stage, level, phase, elements, and linguistics, all evaluated according to contextual information provided by needs/external forces; AI, affective computing, recognition and recommender systems; and/or interaction types/engagement.

An NLP structure may be used for automating a character's interactions. Syntax and structure go hand in hand, where a set of specific rules, conventions, and principles govern the way words are combined into phrases; phrases get combined into clauses; and clauses get combined into sentences. This structure can be used to automate overall body movement and actions.

Quick gestures are equivalent to words. For example, a jaw movement curve value can be tied to head/neck, shoulders, arms, hands, and hips, as well as other body parts with the ability to offset curve value and start time. Longer gestures are equivalent to phrases, such as head/body sways, juts and/or rotations, arm and hand gestures, etc., while overall pose changes can be viewed as sentences.

Using each group in a layered fashion specifically can add desired results and variations of texture. This can create specific movements with purpose all driven by speech. This can be layered with value sliders per body part to control the degree of impact of speech on those body parts. Individual Poses can be added as assets per layer and can be cycled through per phrase/clause/sentences. Users can adjust to their liking then save out presets to set up moods, personalities, archetypes, etc. This can be used to influence different conversational states such as speaking, listening, thinking, interrupts, and refusals.

Inflection points can be based on system settings. In some embodiments, NLP can trigger inflection points, such as how a word is modified to express different grammatical categories like tense, case, voice, aspect, person, number, gender, mood, animacy, and definiteness. Speaking style may be adapted accordingly, which can in turn call upon different sets of animation tags/bundles to fit the appropriate style.

Multilingual embeddings may be used to scale NLP models with different languages other than just English. These can be built using semantic similarities and multilingual natural language understanding models between two languages.

When using NLP, the system can use info from sliders such as gender identity, age, energy level, the personality continuum scale, emotion maps, cultural and ethnicity scale, and/or any other configurable character attributes in conjunction with NLP syntax and structure for word, phrases, clauses and sentence assets in order to adjust speech style. This can be done at different levels and with different cross sections.

Another example of autonomous acting is having a character automatically interact with music (or other audio). In one embodiment, a character may be physically influenced by music. For example, an extroverted character may automatically dance on hearing music (or certain types of music with which the character has an affinity) while an introverted character may simply bob their head. Other aspects of a behavioral model may impact how a character responds to music. For example, a character that grew up in a culture that loves dance may be more prone to dance in response to hearing music, even if naturally introverted. As another example, the choice of character model (e.g., archetype) may impact which style of dance is selected in response to music playing in the environment.

The nature of how a character physically responds to music may also be determined using specific channels within an audio signal defined by one or more of: frequency (e.g., a frequency band), pitch, loudness, etc. Character types or classes can have more than one channel tagged to enable blending of behaviors governed by those channels to vary up movements beyond just adding a collection of movements associated with each channel. Furthermore, different body parts may be governed by different proportions of channels. For example, how characters move their torsos may be primarily governed by a bass frequency range while how they move their arms may be a blend of bass and treble frequencies, etc. A similar approach may be used for determining how a character responds to speech or any other audio. For example, an analysis of speech (e.g., frequency and amplitude) may indicate the mood and/or demographic information (e.g., age) of the speaker and impact how a character responds. As another example, a sudden loud sound (e.g., an explosion or gunshot) may be identified and the character may respond automatically.

Figure 9:
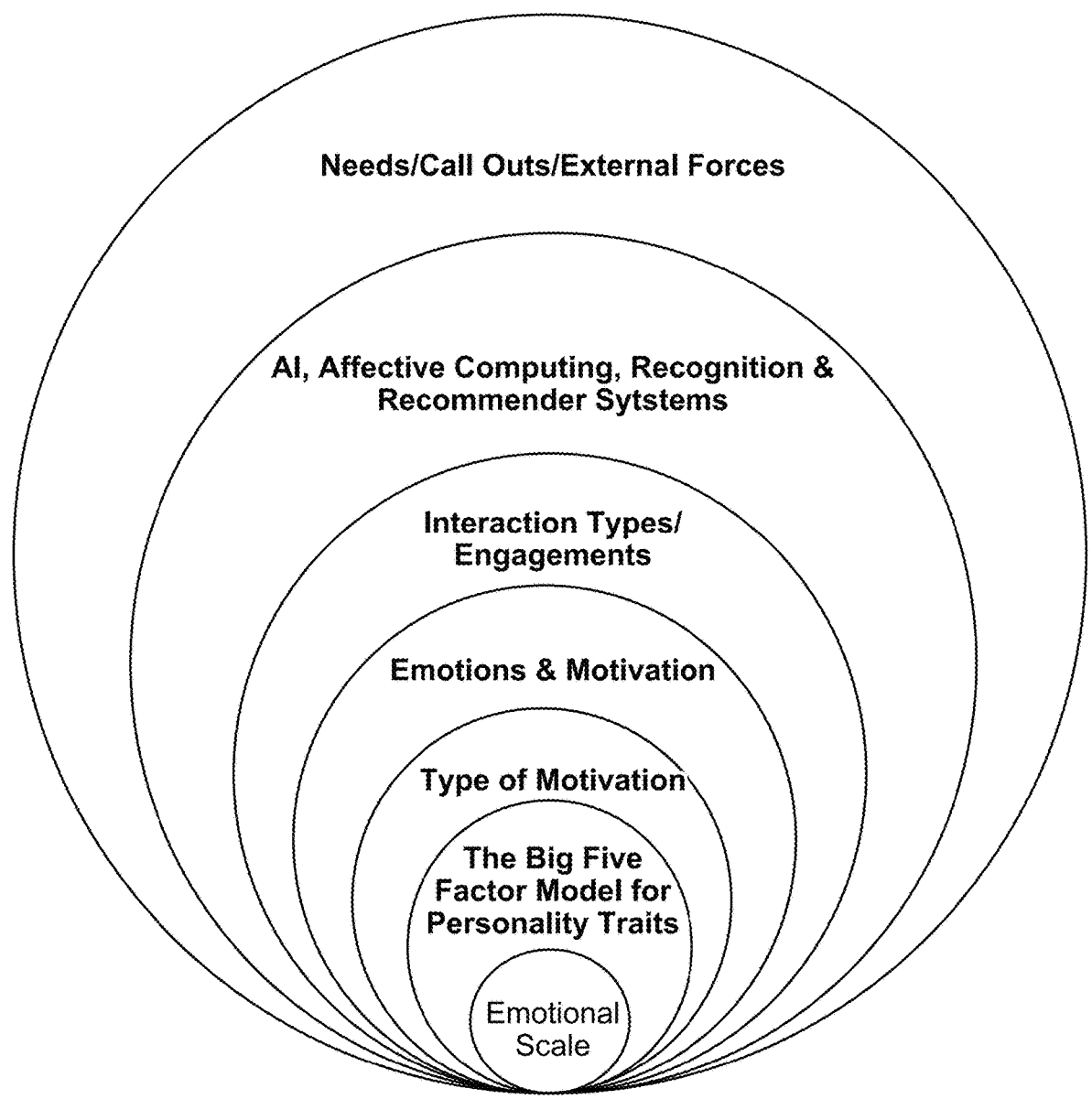
FIG. 9 illustrates a model of a user's psychology (emotions and motivations), according to one embodiment.

The behavior of a character may be influenced by the psychology 322 of the user 320. The psychology of the user may include the user's emotions and motivations. FIG. 9 illustrates one embodiment of a model of the user's psychology. Specifically, FIG. 9 illustrates a high-level overview of the macro to micro and/or micro to macro breakdown that allows the tying together of the user's emotions and needs in order to respond on a granular level. This overview triangulates where the user is emotionally (feelings) and their motivation (needs) to be able to respond accordingly by identifying where they are on the emotional scale and where they are on the big five factor model for their personality traits and finding out what sector they are in to find out what drives them.

In some embodiments, there are three components to emotion for an individual: cognitive/thinking (how they interpret events); physiological (how they physically feel within their body); and behavioral (what they actually do). Examples of emotions and motivation include feelings, arousal, purpose, and expression. Emotions can be expressed on a scale (i.e., with a numerical metric indicating how strongly that emotion is felt). The big five factor model represents personality with metrics for five primary traits: openness, conscientiousness, extraversion, agreeableness, and neuroticism.

The character model may also include AI 340 to provide recognition, recommendations, or sentiment analysis, etc., which can be driven by input from the psychology 322 of the user 320 (e.g., the user's motives and personality, such as the user's position on the spectrum for each of the big five personality traits), a current scenario 342 (e.g., exploratory, normative, or predictive, etc.), strategic modeling 344 (e.g., identifying, suggesting, or improving, etc.), and decisions 346 (e.g., type, style, and strategy).

Figure 11:
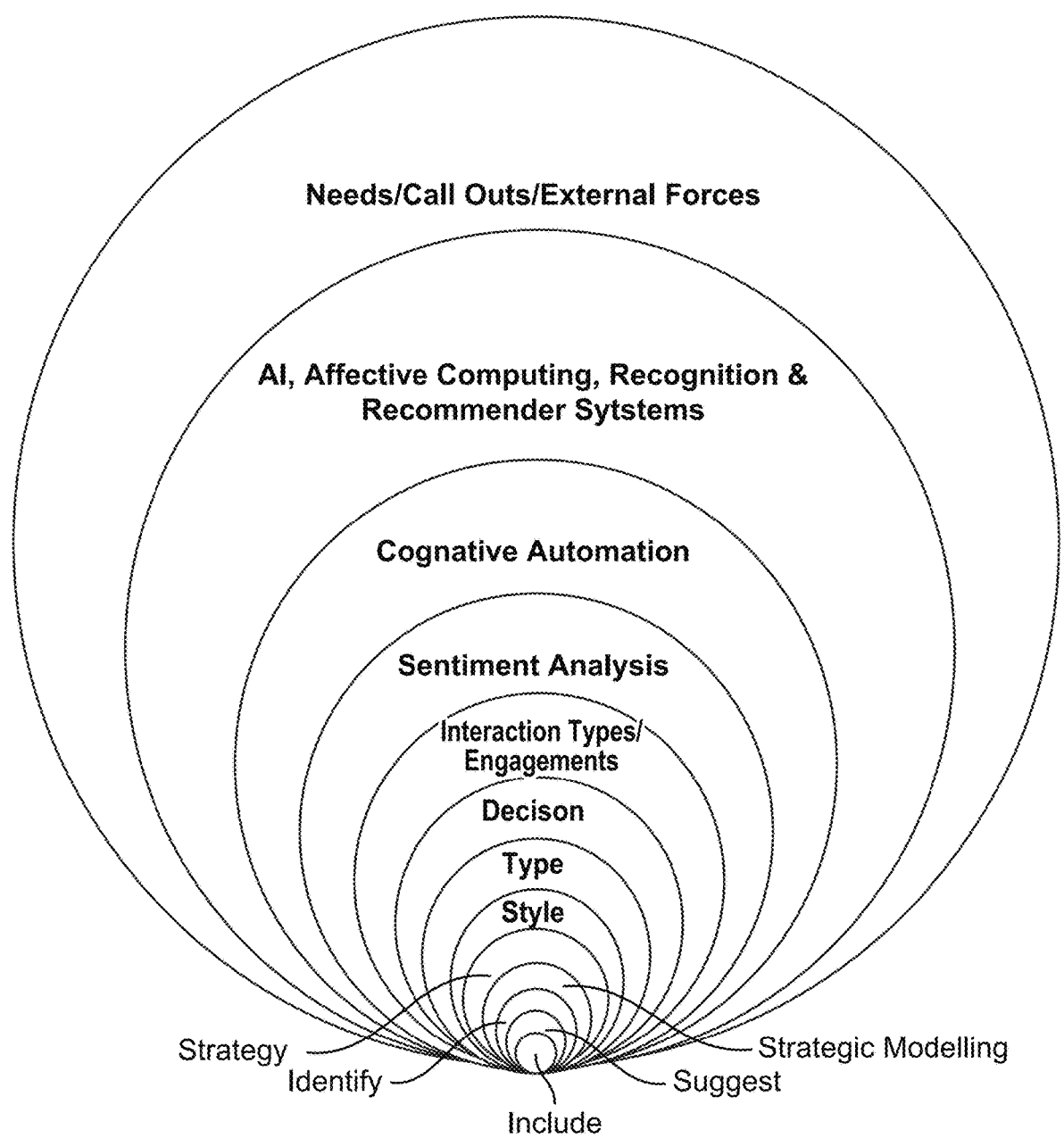
FIG. 11 illustrates the use of AI and strategic modeling to determine the behavior of a character, according to one embodiment.

FIG. 11 illustrates the use of AI and strategic modeling to determine character responses, according to one embodiment. Specifically, FIG. 11 illustrates a high-level overview of the macro to micro and/or micro to macro breakdown that allows AI to cross reference all of these systems above in order to give best granular performances possible through the use of strategic planning models. This may include user needs/external forces/environments, AI, affective computing, recognition & recommender systems; cognitive automation; sentiment analysis (e.g., context-based analysis and aspect-based sentiment analysis); interaction types/engagement; decision (type, style, strategy) and strategic modeling (identity, suggest, include).

In one embodiment, strategic modeling (thinking & planning) is one aspect to recommender systems. Based on aspects gathered from all the data being presented, a strategic model is recommended. Decisions can be made by considering:

Types (problem context, cognitive factors, social context)
  Programmed to Non-Programmed
  Routine to Strategic
  Organizational to Personal
  Policy to Operational
  Individual to Group
  Major to Minor
Styles (analytical, conceptual, directive, behavioral)
  Rational
  Bounded Rationality
  Intuitive
  Creative
  Dependent
  Avoidant
  Spontaneous
Strategies (analytical, heuristic, expertise, random choice)
  Minimize
  Moralize
  Muddle
  Scan
  Deny
  Optimize
Strategic Modeling
  Identify
  Suggest
  Include Thus, using rulesets, AI, or both, types of responses to stimuli may be determined for a character in real-time. The behavioral assets may be tagged with response types. Consequently, a determined response type (or types) for a character to any given stimulus (or set of stimuli) may be mapped to a set of behavioral assets that are available for generating dynamic and nuanced behavior from the character in response to the stimulus. For example, in response to an explosion, the system may determine that a fear-type response will occur (or will occur with a certain probability) and corresponding fear assets are made available to each layer of the behavioral model.

Examples of fear assets for each layer include:
  Idle—anxious, fidgety stance;
  Breathing—the additive breathing animation's frequency quickens to create shallow quick breaths;

Weight Shift—shift animations from the left and right may trigger more often to create an anxious and fidgety feel;

Posture—character may tighten and slouch in order to occupy less space so as to protect itself;

Gestures—individual assets per body part such as:
Face—brows raise, lids widen, mouth opens;
Arms and Hand—hand may come up to cover mouth;
Legs and Feet—fidgety movements like a tapping foot; and
Head and Neck—frantically looking around;

Performances—if there is a specific action that needs to take place for narrative purposes then that full action can be triggered;

Look-Ats—depending on the location, eye aims may scan or target small, medium, or large zones which in turn causes residual movement on both the head and body, with the intensity of the residual movement would be determined by which zone the eyes were looking around in;

Interrupt—if character was in the middle of talking when something frightened them, then the animation may be interrupted and an appropriate animation would triggered to depict the conversation ending abruptly in a realistic way; and Refusing—if nothing applies to this layer in this instance, no asset is triggered.

In one embodiment, a decision for a character can be made by setting up rules of the user, determining their personality and motivation (psychology), analyzing the scenario, and selecting a strategic model accordingly. The decision is made by running through a chosen decision model (e.g., by looking at a decision type, decision style, and decision strategy). If the decision to be made is about an external force, the system may analyze the scenario and then select a strategic model and specific decision model according to the data presented and analyzed.

In some embodiments, decisions may be made using AI. Sentiment analysis used to understand the feelings or opinions that underlie a text. This can include determining and generating an understanding of the user's feelings. A recognition system recognizes patterns in the currently available data (e.g., user, conversation, external force, interaction type, and scenario) and a recommender system offers one or more suggestions based on the data analysis. Strategic modeling may be used to provide a forecasting solution that strengthens the scenario modeling. For example, a strategic model can identify what is wanted (a goal), suggest a way to achieve the goal, and include specific terms that are relevant to achieving the goal.

By introducing contextual information such as character type, personality, age, energy level, etc. to each layer, the assets available for the type of response triggered (in the above example, a fear response) can be filtered for those that are appropriate for the character, enabling more individualized character performances. Additionally or alternatively, each asset in the set may be assigned a probability of triggering based on the contextual information.

Figure 10:
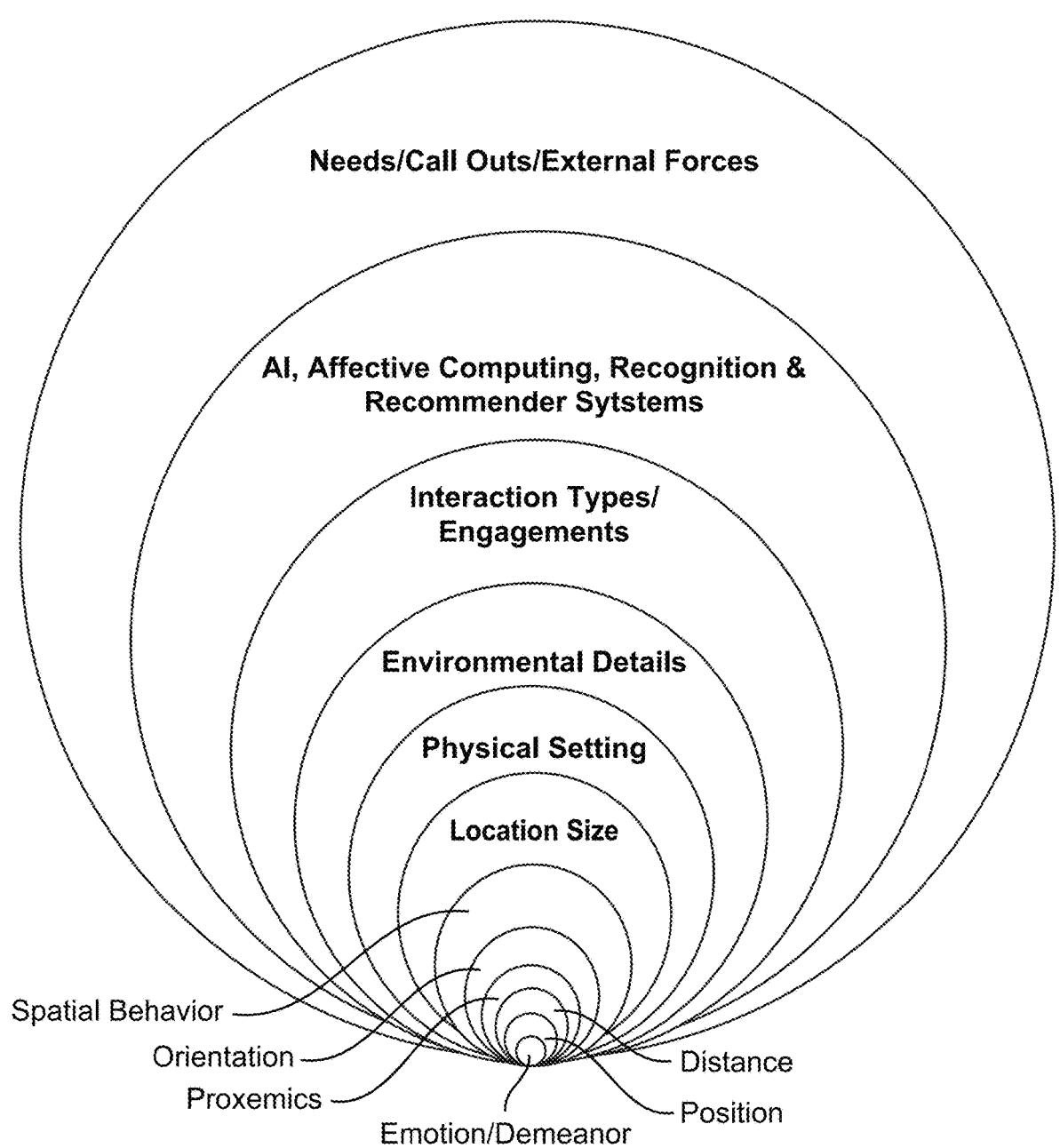
FIG. 10 illustrates the impact of external forces and environments on the behavior of a character, according to one embodiment.

The character model also includes the influence of external forces 350, such as the current physical setting, location size, or other spatial behavior. FIG. 10 illustrates how external forces 350 may impact the behavior of a character. Specifically, FIG. 10 provides a high-level overview of the macro to micro and/or micro to macro breakdown of how external forces affect moods and interactions for characters. This may include interaction types/engagement; environment details (e.g., physical setting and location size); spatial behavior (e.g., orientation, proxemics, distance, and position); scenario modeling; and emotion/demeanor, all evaluated according to contextual information provided by user needs/external forces/environments, AI, affective computing, recognition and/or recommender systems.

The character model can also interact via APIs 360 with other services such as Synthetic Voice, Auto Lip Sync, Chatbots, etc. Thus, the functionality of the character model can be expanded via third-party services and/or the character model can provide functionality to third-party applications.

Referring back to FIG. 2, the script datastore 270 includes one or more computer readable media that store any script instructions for the environment or characters. For example, in a video game, the script datastore 270 may include instructions for a non-player character (NPC) to enter the scene a specified amount of time after the player does or after the player completes a certain task and initiate dialogue with the player. The response of the player's character to the dialogue may then be determined using the layered system (e.g., by analyzing the intent of the NPC with the dialogue and responding accordingly in view of the character's emotional state and other relevant contextual factors). As another example, the script may include instructions for changes in the environment, such as doors locking/unlocking, bombs exploding, trees falling, etc. when one or more conditions are met (with the response being governed by the layered model) as well as changes in the character model for a character or characters (e.g., increasing a confidence metric or degree of extroversion at the completion of a level). As yet another example, in the context of an animated movie, the script may include detailed instructions for dialogue and movements between locations of the characters, but leave determination of things like eye movements, gestures, and other body language in response to the scripted actions to the character behavior module 240.

The behavior assets datastore 280 includes one or more computer readable media that store assets for characters. The assets are instructions for the character to exhibit certain behaviors, from eye movements to gestures to dialogue choices. It should be appreciated that assets may be provided for any action of a character that a developer can conceive of and program. As described previously, the assets may be multi-tagged with conditions for being available to allow the character behavior module 240 to query the behavior assets datastore 280 for relevant assets. The assets may also be tagged with corresponding probabilities of being used by a character if available, which may be dependent on attributes of the character. In some embodiments, the behavior of a character or class of characters may be quickly updated (e.g., in a few minutes) by replacing the behavioral assets that are tagged for that character or type of character in the behavior assets datastore 280.

Figure 12:
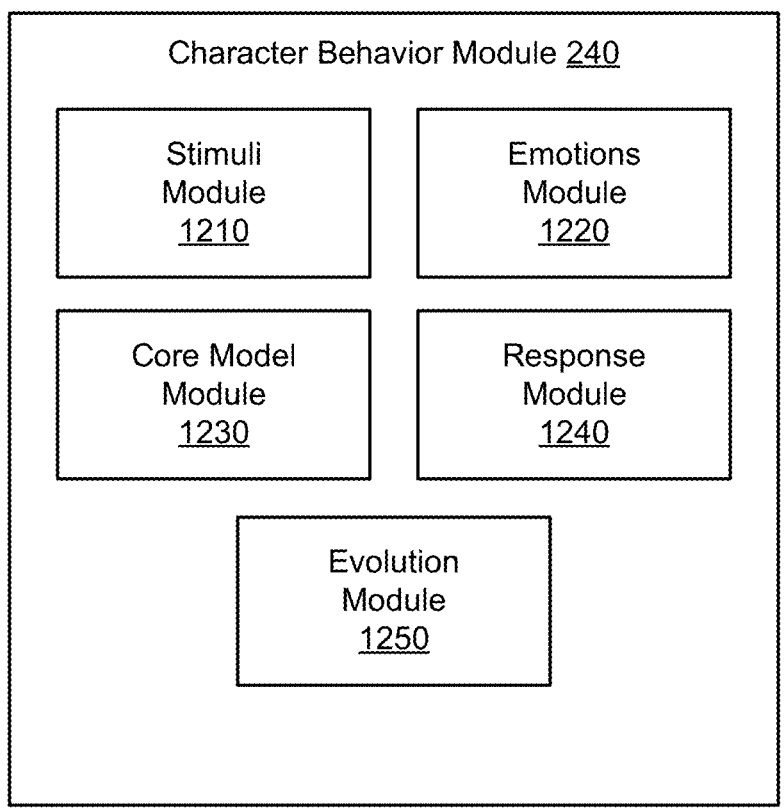
FIG. 12 is a block diagram of the character behavior module of FIG. 2, according to one embodiment.

FIG. 12 illustrates one embodiment of the character behavior module 240. In the embodiment shown, the character behavior module 240 includes a stimuli module 1210, an emotions module 1220, a core model module 1230, a response module 1240, and an evolution module 1250. In other embodiments, the character behavior module 240 includes different or additional elements. In addition, the functions may be distributed among the elements in a different manner than described.

The stimuli module 1210 identifies factors that may affect the character's behavior. These factors may include internal and external stimuli. Internal stimuli are things such as changes in moods/emotions, thoughts, and ideas that may impact both the character's demeanor and how they respond to events. External stimuli are properties of the environment around a character that may impact that character's behavior. Examples of external stimuli include weather, other characters, objects, thematic properties of the environment (e.g., scary, luxurious, homey, etc.), sounds (including music), smells, or any other properties of the environment that may impact the character's behavior. In one embodiment, the stimuli module 1210 applies a set of rules to identify all possible external stimuli in an environment. The rules may be generated using machine-learning techniques. Alternatively, for characters that will be used in a known, controlled environment, such as a level of a game, potential external stimuli may be tagged in the environment data and the stimuli module 1210 may maintain a list of potential stimuli within a predetermined distance of the character (e.g., within a set radius, within a same region or level, or the like).

The emotions module 1220 tracks a current emotional state of the character, which may change over time in response to scripted events, interactions with the environment, or both. When moods, feelings and emotions are called upon, corresponding information such as lists of data, assets, and rule sets specifically tailored and designed to create and emulate specific moods, feeling, and emotions are called into play. On a more micro level, in some embodiments, the system may identify individual users, interaction types and conversations, story and character arcs, and the like, to have a more emotionally granular and individualized performances and experiences for the user.

As the system injects emotions into other animation layers to create or identify assets to trigger, the system may provide the user with the ability to save out and/or call upon presets. For example, a user may save out or call upon individual layer presets as well as all layers combined as a macro preset. These presets may then be saved and called upon for a multitude of purposes and uses. For example, this may be used to create shades of an emotion or variety within a shade of an emotion. In addition, a user may call upon specifically tailored animations at specific moments as desired.

In one embodiment, both generic and specific relationships can impact the behavior of a character. How emotions, feelings, and moods manifest may be different depending on what other characters are present and their relationships to the emoting character. For example, exhibiting a "joy" emotion may be different depending on what other characters are present, such as: a current partner, a former partner, a child, a best friend, a mother, a father, a boss, a stranger, a pet, an antagonist, etc. The character is still the same person at heart, but the specific poses, gestures, mannerisms, energy level, tone, and use of language, etc., varies based on the character's relationships with the people around them.

Figure 13:
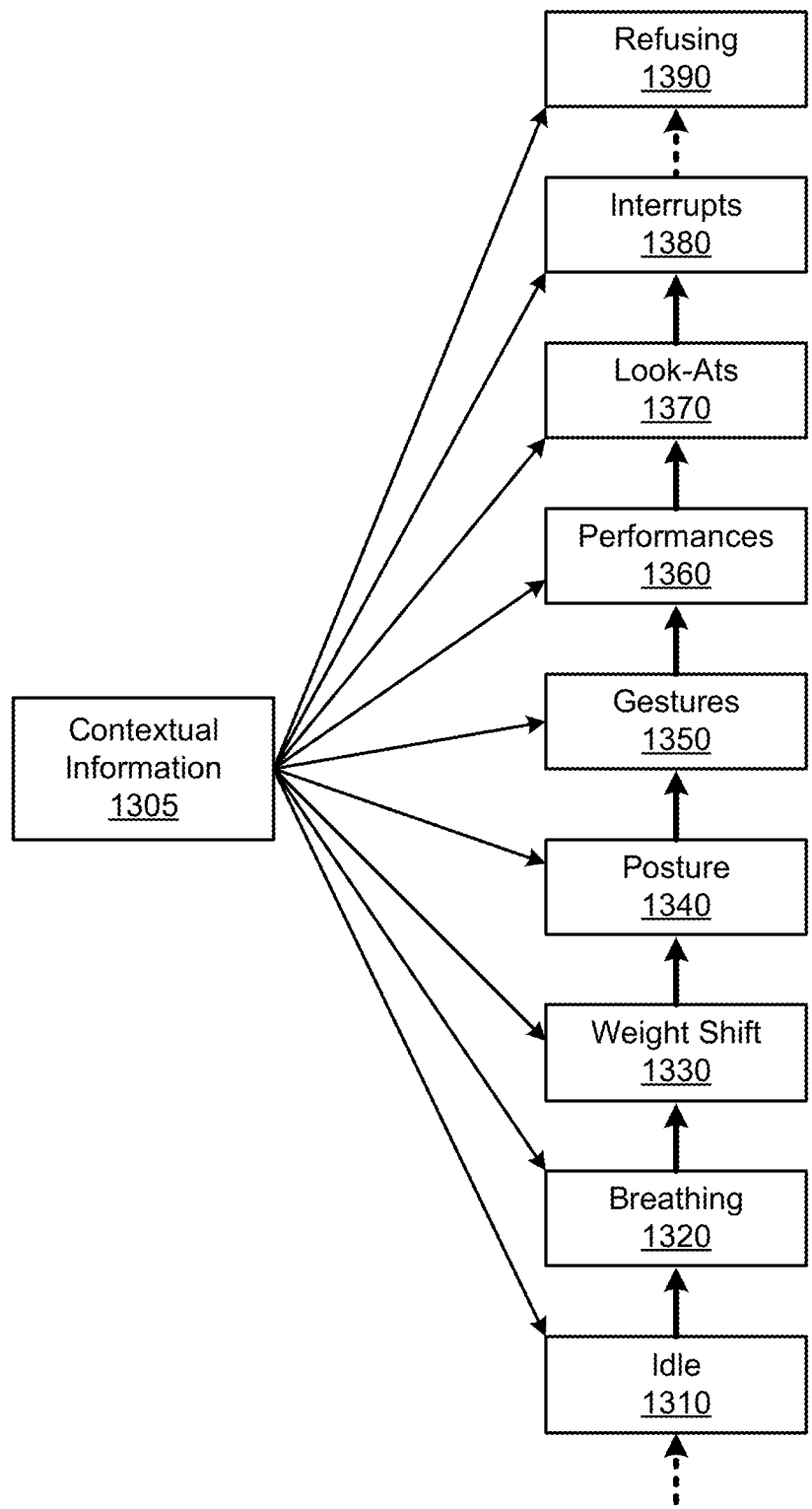
FIG. 13 illustrates an additive layered behavioral system, according to one embodiment.

The core model module 1230 provides a set of additive behavioral layers that are neutral, meaning that they can be applied for all (or at least almost all) characters, referred to as the core model. FIG. 13 illustrates one embodiment of the core model. In the embodiment shown, the core model includes an idle layer 1310, a breathing layer 1320, a weight shift layer 1330, a posture layer 1340, a gestures layer 1350, a performances layer 1360, a look-ats layer 1370, an interrupts layer 1380, and a refusing layer 1390, all of which receive contextual information 1305 as input. Other embodiments of the core model includes different or additional layers. Furthermore, the layers may be arranged in different order. The layers may be modular, meaning new layers can be added or existing layers removed without making modifications to the other layers.

The contextual information 1305 can include one or more of: emotions, demographic information for the character, a current energy level of the character, detected events, proximity of other characters, properties of the environment, information about the user, and the like. Using the layers of the core model (in conjunction with other aspects of the system) allows for variety within targeted organic performances that are influenced by the contextual information 1305. The performances can include the mixing and matching of assets, as well as their intensities and frequencies per layer, working towards a common goal. By providing these types of core layers, the system enables a user to create a wide range of organic variations simply by adding or subtracting any of the animations or poses on each layer without having to manually determine the character's behavior in response to every external stimulus.

The idle layer 1310 may also be referred to as the Base Keep Alive Layer. Characteristics of this layer may include:
 1. Simple and Clean Idle Animations;
 2. Quieter, typically not broad range movement;
 3. Looping indefinitely while not feeling repetitive; and
 4. Easily allowing additive animation on top and not causing competition in movement.

Figure 14:
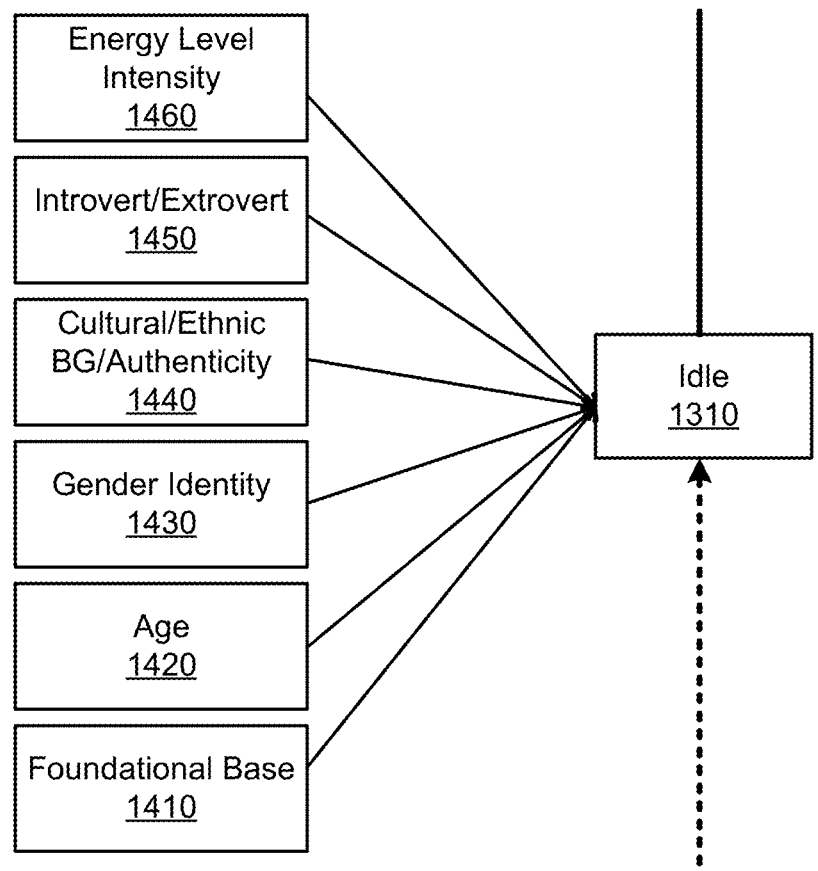
FIG. 14 illustrates inputs to the idle layer of the additive layered behavioral system, according to one embodiment.

FIG. 14 illustrates inputs from the character model to the idle layer 1310, according to one embodiment. The inputs include the following properties that may influence formulation of the assets of a character:

Foundational Base 1410: Assets that can be applied to all humans. The foundational base 1410 may include a core behavioral model on which additional assets and/or modifications based on demographic and other factors of the character can be built. Thus, the foundational base 1410 may be viewed as a set of default behaviors that are modified or added to by the specific character traits and attributes of individual characters.

Age 1420: Assets with behaviors and moods/emotions linked to age. For example, specific idle behaviors can be added to the idle layer to have the character at this level feel/carry themselves in ways that are probabilistically more likely to corresponding with a specified age (e.g., an older character may have a hunched pose and be less energetic than a younger one).

Gender Identity 1430: Assets with behaviors and moods/emotions linked to gender identity. For example, specific idle behaviors can be added to the base idle layer to have the character at this level feel/carry themselves in ways that are probabilistically more likely to correspond with a specified gender identity.

Cultural/Ethnic BG/Authenticity of Character 1440: Assets can be added to modify behaviors in view of a character's authenticity of character. This authenticity may evolve throughout the storyline.

Introvert/Extrovert 1450: Assets may be added to modify idle behaviors in view of the degree of extroversion/introversion of the character. For example, extroverted characters may generally make more expansive gestures to indicate the same mood/emotion than introverted characters.

Energy Level 1460: Behaviors may be impacted by a character's energy level. A character may have a default energy level (e.g., generally energetic versus generally laid back) but also be modified by dynamic factors (e.g., whether the character is tired). The default energy level may be impacted and/or governed by the character's position on the introversion/extroversion spectrum.

Note that these nodes may be carried throughout each layer of the system and are not limited to only the idle layer. Furthermore, because the system is layer-based, additional layers can be added or existing layers removed from the system in a modular fashion without changing the other layers. When used, the system combines the outputs of the individual layers to create a nuanced performance of the character.

Figure 15:
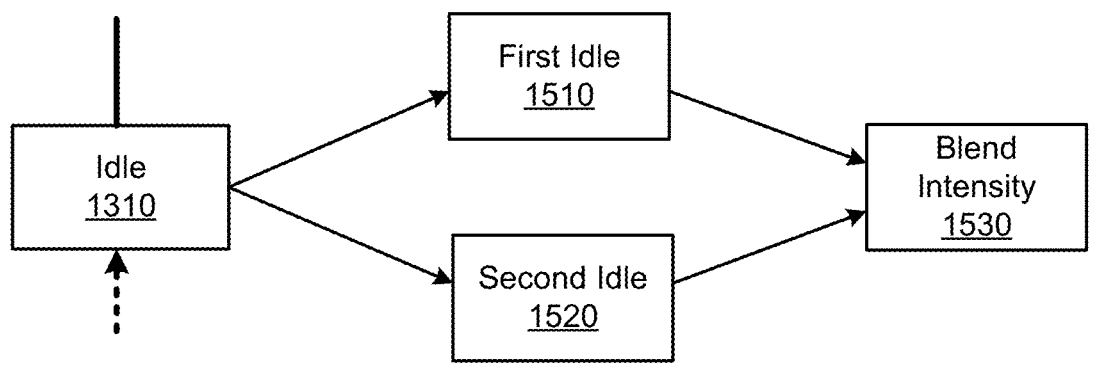
FIG. 15 illustrates blending of idle behaviors, according to one embodiment.

FIG. 15 illustrates an embodiment where idle behaviors can be blended. Specifically, the idle layer 1310 outputs two (or more) idle behaviors, a first idle 1510 and a second idle 1520. The character may initially exhibit entirely the first idle 1510 before the two idles are blended according to the blend intensity 1530. For example, to transition from the first idle 1510 to the second idle 1520, the blend intensity 1530 of the first idle may be gradually decreased while the blend intensity of the second idle is gradually increased. Thus, the system mixes in aspects of the second idle 1520 in increasing amounts until the character exhibits entirely the second idle 1520. Additionally or alternatively, the layer intensity of each idle may be set from 0 to 1, providing complete control for more complex combinations than transitions. Furthermore, more than two idles may be blended, further increasing the options for nuanced performances.

Figure 16:
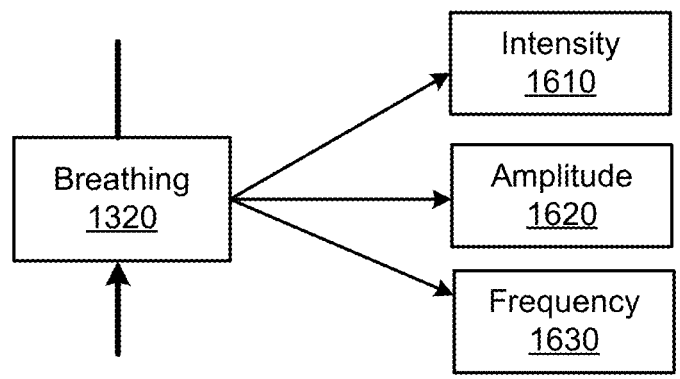
FIG. 16 illustrates the breathing layer of the additive layered behavioral system, according to one embodiment.

FIG. 16 illustrates one embodiment of the breathing layer 1320. The breathing layer 1320 may include the following characteristics:
1. Having a variety of breath animations;
2. Allowing manipulation of animation by adjusting the intensity 1610, amplitude 1620, or frequency 1630;
3. When used in conjunction with the idle layer, a multitude of unique neutral idles may be created by adjusting the values of these two assets.

Figure 17:
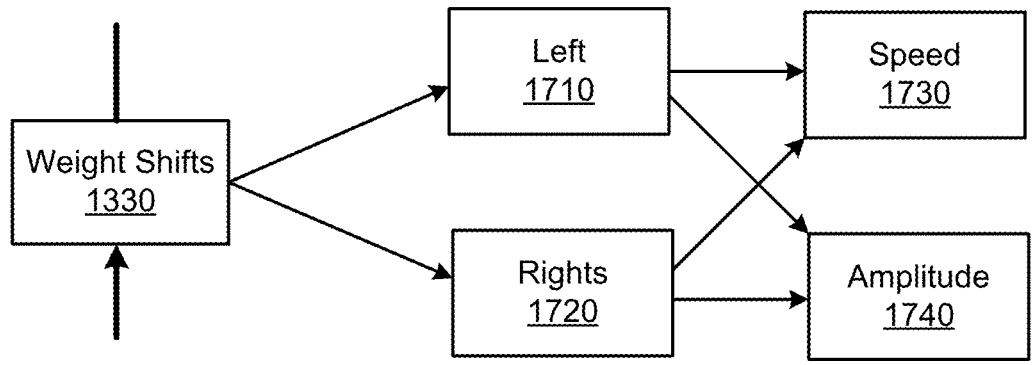
FIG. 17 illustrates the weight shifts layer of the additive layered behavioral system, according to one embodiment.

FIG. 17 illustrates one embodiment of the weight shift layer 1330. The weight shift layer 1330 may provide control through script call-outs during a shifting of a character. In one embodiment, the weight shift is separated into a left component 1710 and a right component 1720. Each component may have its speed 1730 and amplitude 1740 independently controlled. For example, weight shifts may be timed to events such as a change of emotion, a new thought, while waiting, or other suitable events. In other examples, the layer may play alternating sides and may include different types that can play in randomized order or that can play at specifically timed shifts. Additionally or alternatively, the amplitude 1740 (e.g., the height of a weight shift) may be randomly adjusted independently from the timing of left/right shifts. This increases granular control and gives more variation. In some embodiments, the weight shifts layer 1330 may be broken down into sublayers in order to control rotations and translations separately.

Figure 18:
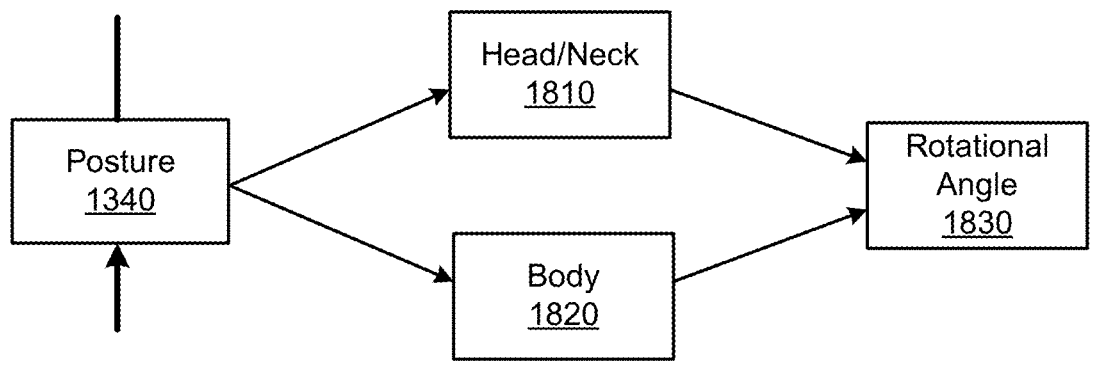
FIG. 18 illustrates the posture layer of the additive layered behavioral system, according to one embodiment.

FIG. 18 illustrates one embodiment of the posture layer 1340. The posture layer 1340 may enable the adjustment of body posture through a rotational axis. By setting the intensity of the posture rotations, important information about interpersonal relationships may be conveyed. In the embodiment shown, posture layer 1340 can independently control the angle of rotation 1830 of the character's head/neck 1810 and body 1820. Thus, a wide range of postures may be generated depending on the specific angles of rotation 1830 used.

Figure 19:
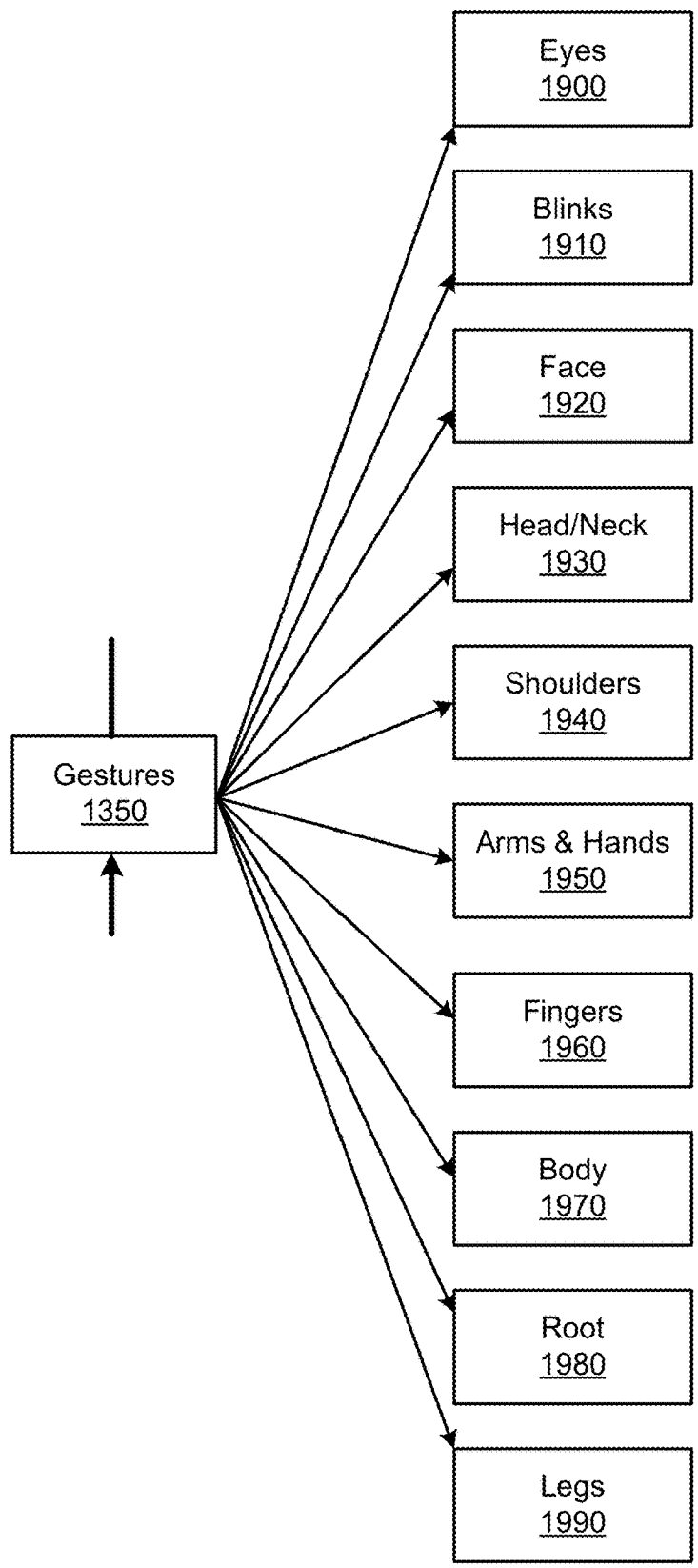
FIG. 19 illustrates the gestures layer of the additive layered behavioral system, according to one embodiment.

FIG. 19 illustrates one embodiment of the gestures layer 1350. The gestures layer 1350 may provide visible bodily actions to communicate particular messages, individually or in conjunction with speech, by calculating the situational intent at any particular moment. Both conversational and/or non-conversational physical gestures may be used to enhance the humanity of the character. In the embodiment shown in FIG. 19, the gestures layer 1350 is broken up into individual body parts. Specifically, the illustrated gestures layer 1350 includes distinct portions for control of the character's eyes 1900, blinks 1910, face 1920, head/neck 1930, shoulders 1940, arms and hands 1950, fingers 1960, body 1970, root 1980, and legs 1990. This may provide additional flexibility and variety in the character's behavior. For example, each body part may be called in-script to play in unison to provide a singular performance. In addition, gestures associated with a character holding a prop also may be used, which may be further divided into props that require one hand or two hands. Additional body part layers may be added and existing layers removed as needed or desired for a particular use case.

In some embodiments, the system controls and blends gesture animations based on a region at which the gesture is directed. For example, the character directional gesture regions may be defined as four regions: (1) facing forward (toward a user or another character); (2) turned to the right; (3) facing away; and (4) turned to the left. The system may blend together animation performance assets tagged for each region on the fly as a character rotates and crosses into a different rotational region. For example, a character's hand gestures may change quite drastically if the character were speaking to someone while facing them versus when either turned to the left, turned to the right, or turned away from the user or other character to which they are speaking.

Figure 20:
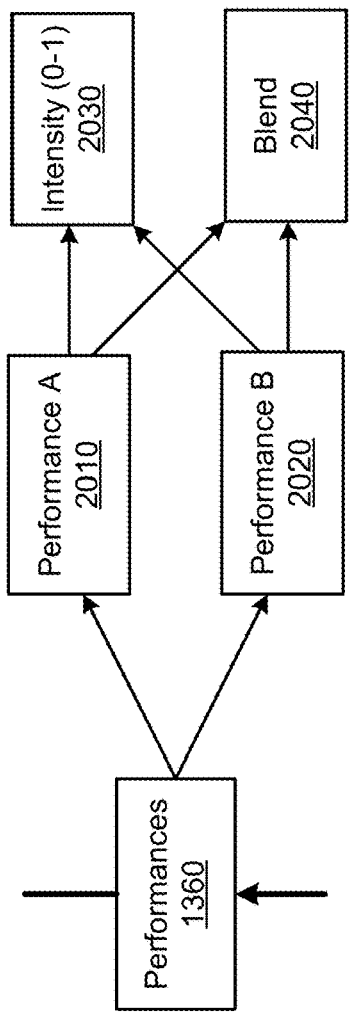
FIG. 20 illustrates the performance layer of the additive layered behavioral system, according to one embodiment.

FIG. 20 illustrates one embodiment of the performance layer 1360. The performance layer 1360 enables the character to perform animation performances. For example, a performance may include taking a step to the right or left, revealing a secret, giving a present to another character, or any other collection of body movements that has contextual meaning. In some embodiments, performances (e.g., performance A 2010 and performance B 2020) may be blended 2040 or have their intensities 2030 individually set. In much the same way that blending of idles enables rich and nuanced performances, blending between performances also provides a great deal of variety and nuance to the behavior of the character.

Figure 21:
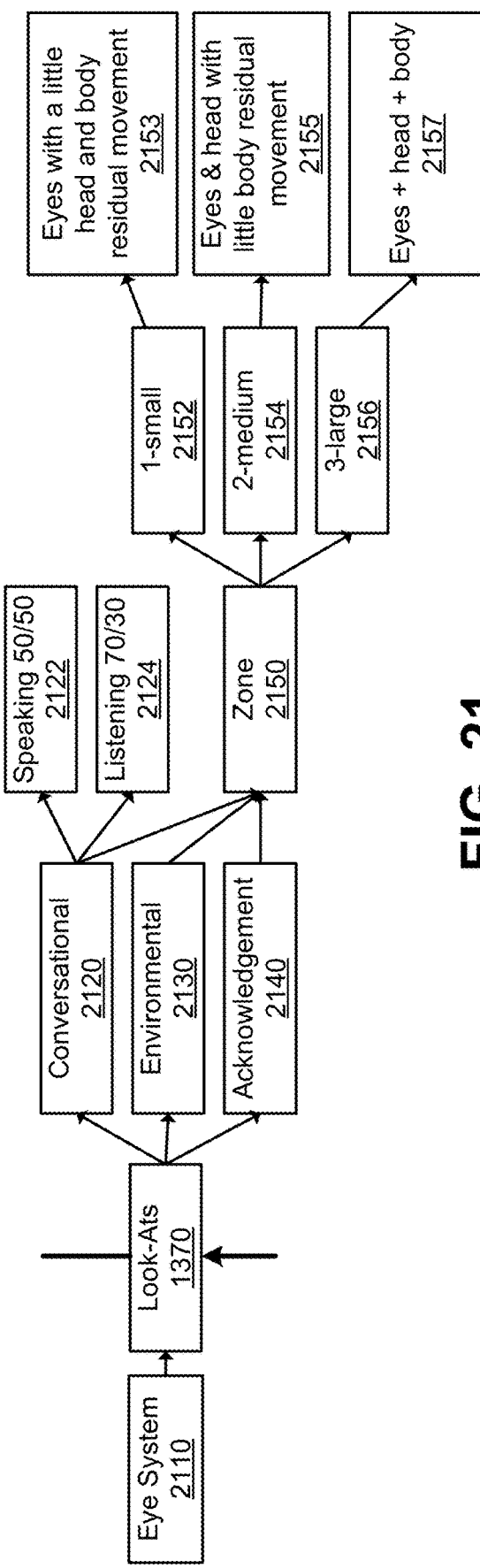
FIG. 21 illustrates the look-ats layer of the additive layered behavioral system, according to one embodiment.

FIG. 21 illustrates one embodiment of the look-ats layer 1370. The look-ats layer 1370 is driven by an eye system 2110. The eye system 2110 determines how the character's eyes behave, such as gaze direction, blink rate, blink pattern, and pupil size.

Figure 22:
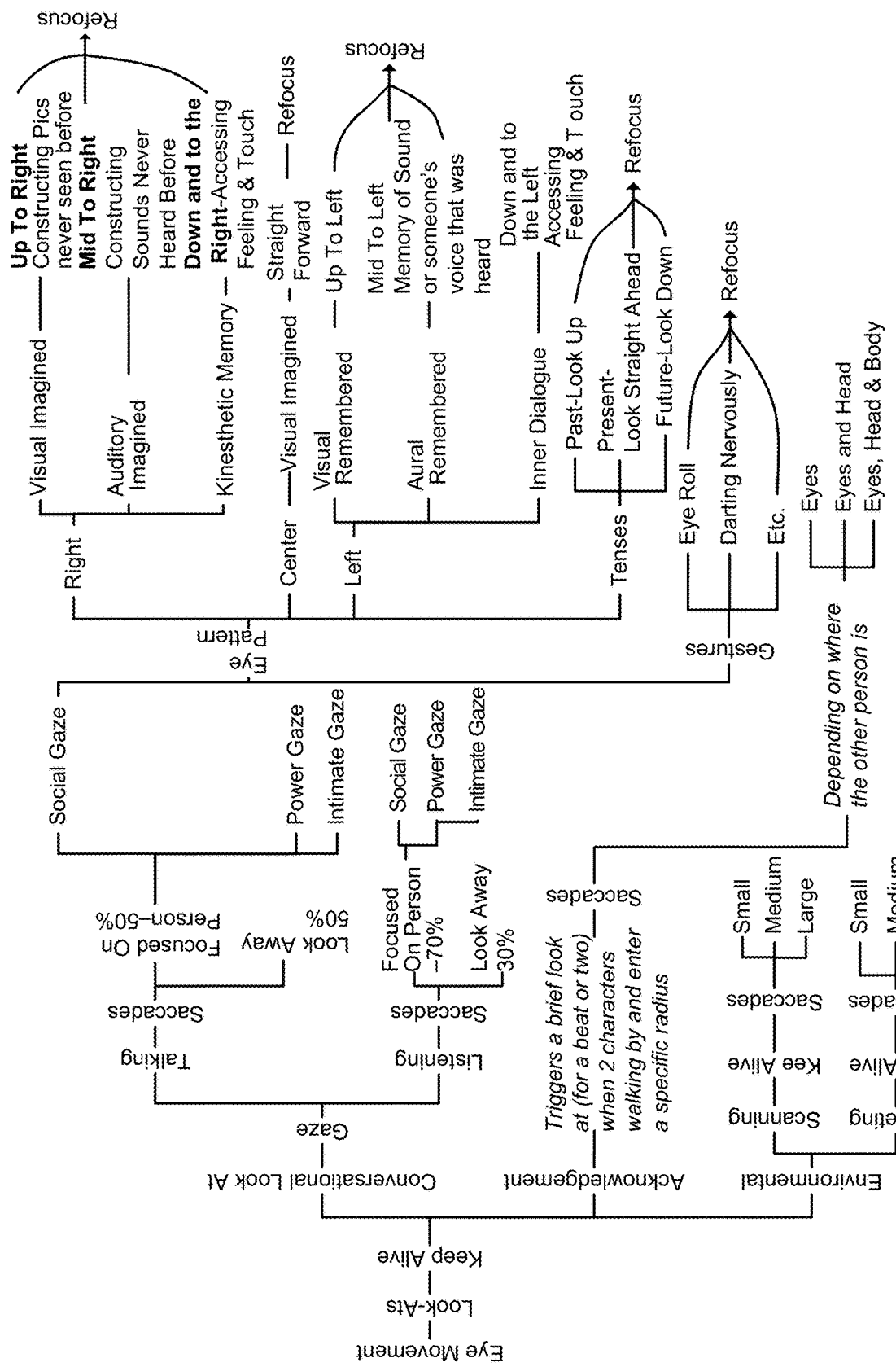
FIG. 22 is a decision tree for an eye system determining eye aim, according to one embodiment.

FIG. 22 shows an eye system 2110 decision tree pertaining to eye aim, according to one embodiment. The eye system 2110 may include a base layer for various types of aim movements (i.e., where the character's gaze is directed).

In the embodiment shown, the base layer allows for three types of look-at behavior: conversational 2120, acknowledgment 2140, and environmental 2130. For conversational behavior, the character's gaze direction depends on whether the character is speaking or listening. When speaking, a character may be focused on the other person approximately 50% of the time and look away approximately 50% of the time. In contrast, when listening to someone, the character may be focused on the person approximately 70% of the time and look away approximately the 30% of time. For environmental behavior, the look-ats may include various interactions with the environment, such as scanning or targeting. For acknowledgment behavior, two characters briefly look at each other (e.g., for a beat or two) when the characters enter within a specific radius of each other (e.g., three meters). In some embodiments, the distance may depend on which direction the characters are approaching each other from (e.g., a player character may react at a different distance to characters approaching from behind, the sides, and the front), and may affect the eyes, eyes and head, or the eyes, head, and body.

The keep alive layer provides eye movements for the character when the character is not engaging with other characters or events. In one embodiment, the keep alive layer induces a high frequency jitter to the character's eye movements to provide subtle organic dancing of pixel movements. Thus, the character continues to appear alive even when not engaged with a specific stimulus or action.

In each case, the eye movements may account for zones 2150. Zones may include designated areas for the eyes to aim and how the character aims their eyes at the designated areas. For example, a small zone 2152 may include the eyes aiming at the target with the head and body performing residual movement 2153, a medium zone 2154 may include the eyes driving the head to look at the target with the body performing residual movement 2155, and a large zone 2156 may include the eyes driving the head and the body 2157 when aiming at the target.

The example eye system 2110 also includes a saccadic movement layer that may provide quick, simultaneous movement of both eyes between two or more phases of fixation in the same direction and/or and or Layer Opacity with 0=Laser Focus (small Range of Saccadic Motion) to 1.0=Thinking (Larger Range of Saccadic Motion).

Figure 23:
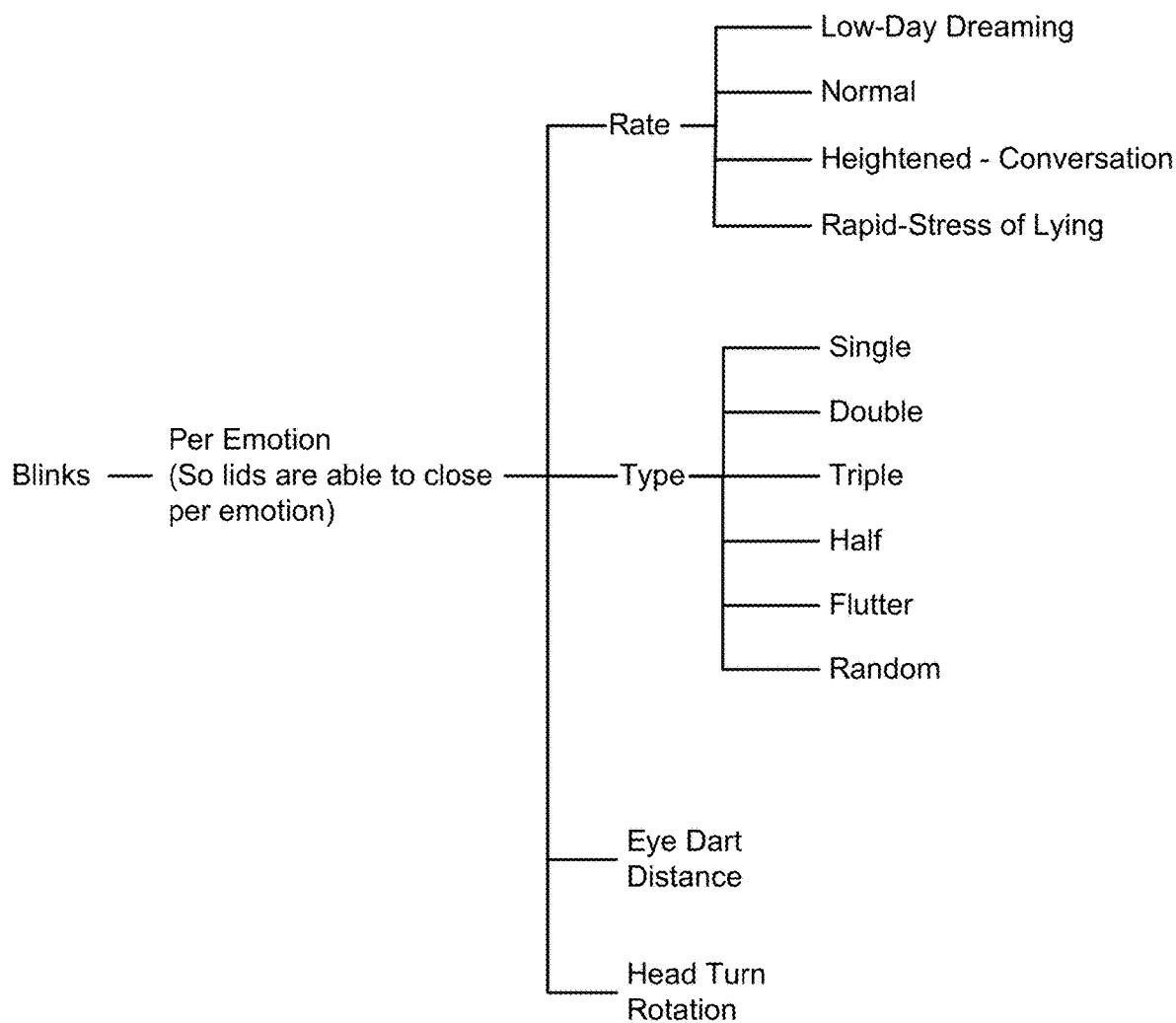
FIG. 23 is a decision tree for an eye system determining eye blinks, according to one embodiment.

FIG. 23 is a decision tree for a blinks layer of the eye system. The illustrated blinks layer defines various blink types (e.g., single, double, triple, half, flutter, etc.) and rates (e.g., low blink count—daydreaming, normal blink count, heightened blink count—Conversation, rapid blinks—stress or lying). Blink types may be created by adjusting the frequency and/or speed of animation assets based on the current emotion of the character. Note that blinks may occur during natural pauses in conversation, based on emotions (e.g., to make sure the lids close correctly per emotion), or in response to other suitable triggers, such as wind or dust. Furthermore, eye dart distance and head rotation distances may trigger the blink layer.

Figure 24:
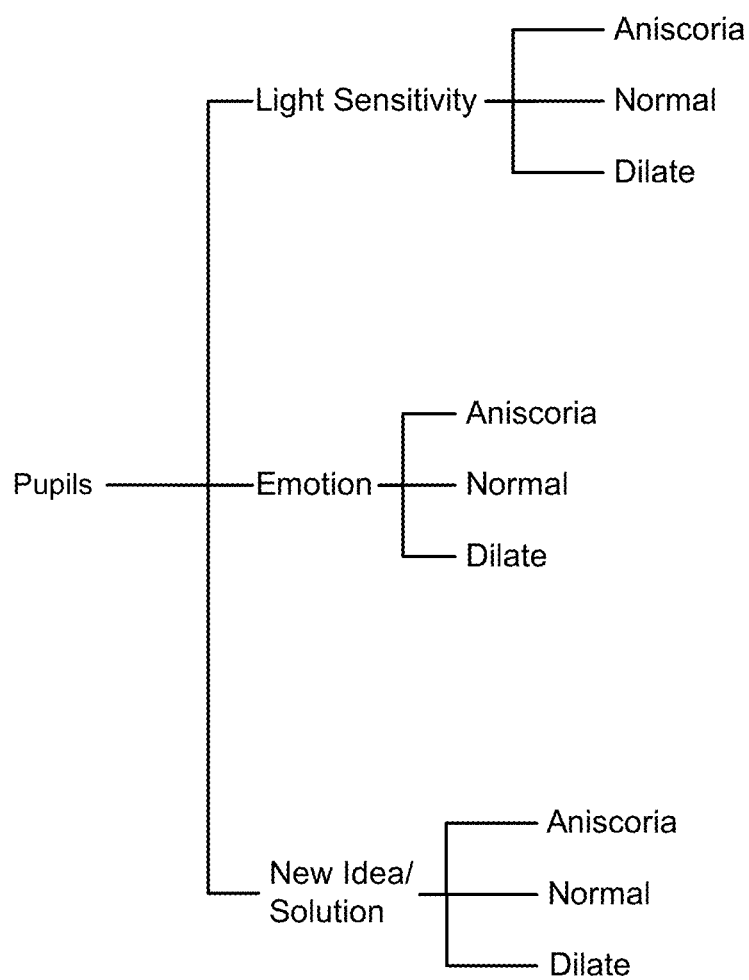
FIG. 24 is a decision tree for an eye system determining pupil response, according to one embodiment.

In some embodiments, the eye system also includes a pupils layer that controls changes in size of pupils due to light sensitivity or emotion, etc. For example, the character's eyes may dilate when the character has a new idea or solution to a problem, etc. FIG. 24 is a decision tree for an example pupils layer.

Another example layer for the eye system is an eye patterns layer with cues (visual, kinesthetic, or auditory), tenses (past, (look up), present (look straight ahead), or future (look down), and gestures (eye roll or darting eyes, e.g., due to insecurity or nervousness, etc.).

The eye system 2110 can greatly increase the humanity of the character by providing dynamic eye movements that respond to activity in the environment. For example, the character may glance in the direction of a loud sound, make and break eye contact during a conversation, exhibit rapid blinking in the presence of dust, roll their eyes in response to something being said they dislike, and perform a wide range of other eye movements in response to external stimuli that increase the realism of the performance.

Figure 25:
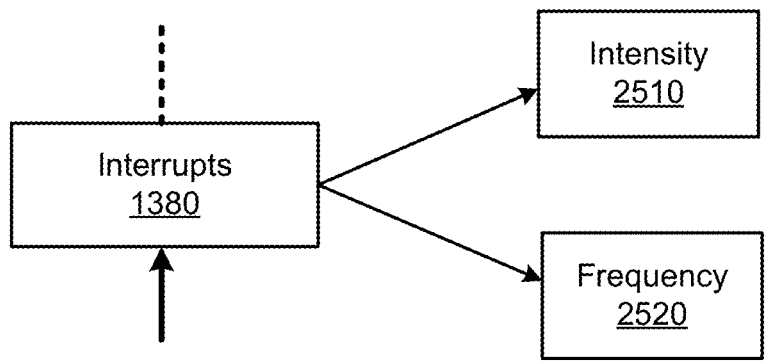
FIG. 25 illustrates the interrupts layer of the additive layered behavioral system, according to one embodiment.

FIG. 25 illustrates one embodiment of the interrupts layer 1380. The interrupts s layer may include animation performances that can be triggered as the character comes back to focus on the user. For example, an animation may include a take, a double take, a head jut back and down, etc. Interrupts also may be used if the user interrupts the character mid-sentence or action such that the current animation being played is cut short and a new animation would play in order to react accordingly. The up and down intensities 2510 and frequencies 2520 may be adjusted on a case by case basis. Use of interrupts can provide smoother transitions when the character changes focus by damping or covering sharp transitions between states that may be caused by other layers.

Figure 26:
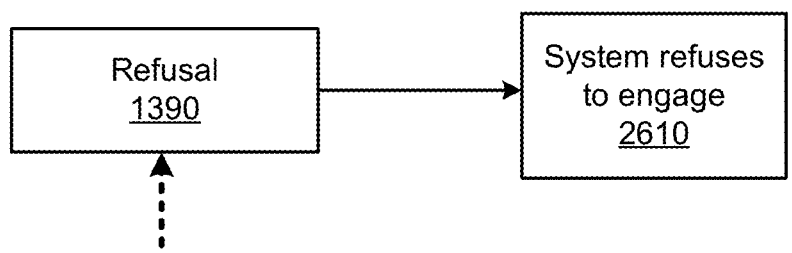
FIG. 26 illustrates the refusals layer of the additive layered behavioral system, according to one embodiment.

FIG. 26 illustrates one embodiment of the refusals layer 1390. The refusals layer may include animation performances that can be triggered if a user crosses a line. For example, if a customer is rude to an agent, the system may refuse to engage 2610. To provide a more detailed example, an autonomous customer service agent, set to the archetype of "Jester" is assisting the customer by getting them the information they were asking for, while keeping the session lighthearted (a way that would reflect the character and behavior model that is associated with Jester Archetype). In the middle of the interaction, the customer becomes irate due to something in the background of the user and begins to take it out on the agent by either speaking or texting in an abusive manner to the agent. The agent, again in a lighthearted manner, then lets the customer know this is not acceptable and tries to diffuse the situation. If the abuse continues, the agent can let the customer know that it will have no choice but to discontinue the session. Because of the light-hearted nature of the Jester archetype, the final decision to discontinue interaction may take longer to reach than for other archtypes, such as a sage archetype.

As another example, if a player offends a NPC in a game, the NPC may walk away and not engage with the player (e.g., if the player and the NPC are in the middle of a conversation and the player hits the NPC, the NPC can deem that action an unacceptable response, triggering an interrupt that causes the NPC to walk/run away in a way that reflects the character and behavior model associated with the NPC.

The refusals layer may be set to override other layers. For example, once the limit pertaining to the set character model is reached, the character can choose to interrupt and refuse to participate in a way that would reflect the behavior and character model in the active engagement and not trigger any assets associated with other layers.

Figure 27:
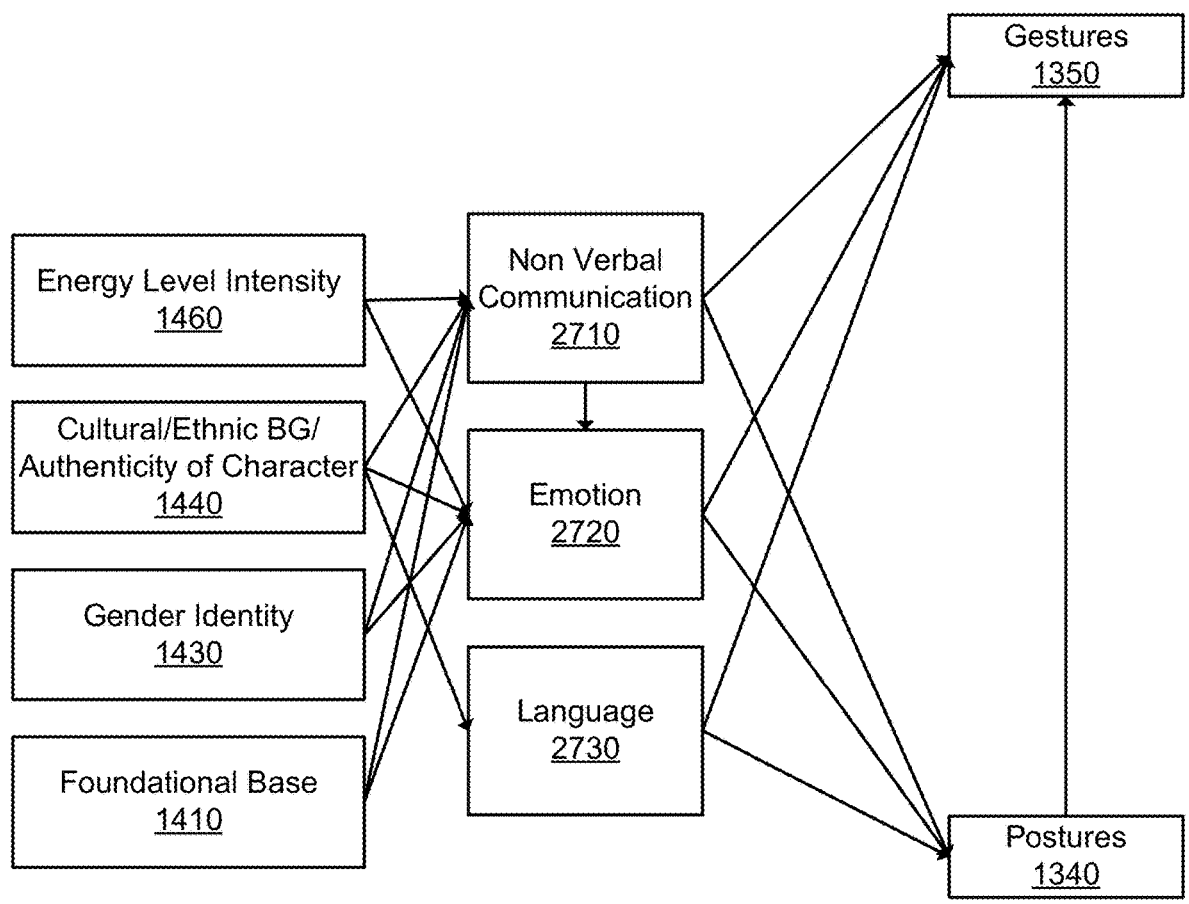
FIG. 27 illustrates an example of how character attributes can be injected into layers of the additive layered behavioral system, according to one embodiment.

FIG. 27 illustrates an example of how character attributes can be injected into layers of the additive layered behavioral system, according to one embodiment. It should be noted that this is just one example of character attributes and other contextual information being injected into additive layers of the core model and that a wide range of different contextual information may be injected into a wide range of different combinations of layers.

In the example shown in FIG. 27, information from a character's core and emotional models is being injected into the posture layer 1340 and the gestures layer 1350. The nodes to the left (in this case, a non-verbal communication node 2710, an emotion node 2720, and a language node 2730) provide topics to consider when using the system to select posture and gesture assets for the character. These topics may include the emotion to be conveyed, the subject matter being conveyed through the use of non-verbal communication, the postures and gestures required for different languages (which may include sign languages), cultures, or character types, as well as other topics.

There are also four nodes shown to the far left that inform the topics injected into the posture layer 1340 and the gesture layer 1350. Example inputs include the foundational base 1410, age 1420, gender identity 1430, cultural/ethnic background/authenticity of character 1440, introversion/extroversion 1450, and energy level intensity 1460. In other embodiments, different or additional inputs may be used in generating pose and/or gesture sets for a character. An asset formulation model similar (or identical) to the one used for the idle layer may provide input for generating a set of postures and/or gestures for the character. Thus, many aspects of the character model may be combined to ultimately select a posture and gesture for the character, as well as the intensity or manner in which the character exhibits the posture and gesture. For example, an extrovert may perform a dance step with greater extension of their limbs than an introvert exhibits when performing the same dance step.

Figure 28:
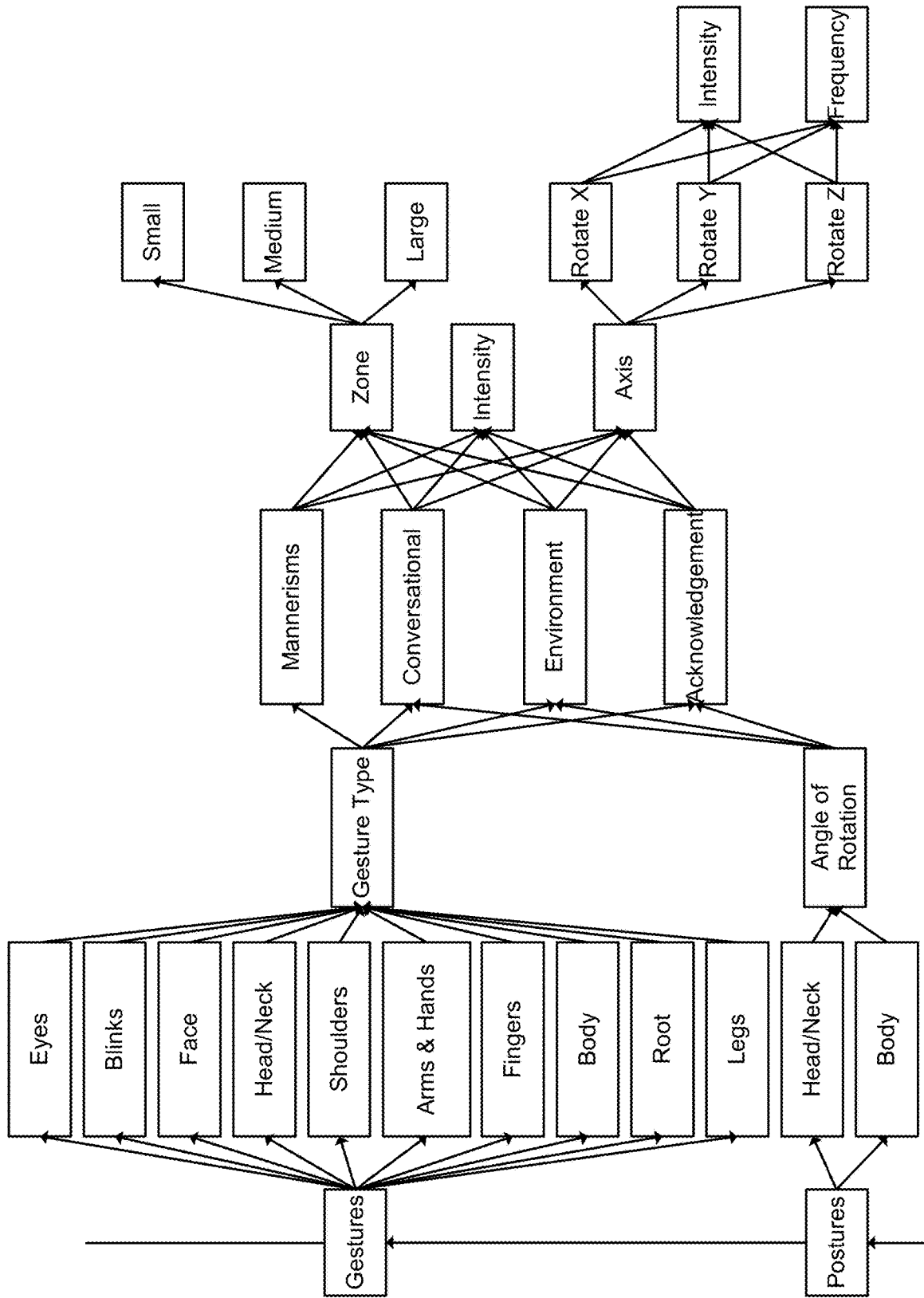
FIG. 28 illustrates an example of how output from layers of the additive layered behavioral system can be combined to generate dynamic behaviors, according to one embodiment.

FIG. 28 illustrates an example of how output from layers of the additive layered behavioral system can be combined to generate dynamic behaviors, according to one embodiment. FIG. 28 shows additional nodes relating to the posture and gesture layers. For example, the system may allow for the targeting of different types of attributes such as conversational, environment, acknowledgement, mannerisms, and others. Gestures may cause motion of one or more body parts of the character. For example, a hand gesture may propagate through the arms and cause motion in the shoulders and neck. An extreme (e.g., high energy) hand gesture may cause movement of the character's whole body. In this way, a highly detailed and specific set of asset groups may be created or selected and delivered by the system.

In some embodiments, the system also may break down the various attributes and group them into zones (e.g., small, medium, and large gestures). The intensities of the postures and gestures also may be adjusted as the postures and gestures are activated. In addition, the postures may be broken down to individual axes so that their intensities and frequency may be adjusted. In one example, adjusting the frequency may create movements such as head shakes, head nods, and other types of gestures. By controlling the intensity, the movements may be controlled to start or stop gradually to emulate natural movements more accurately.

In some embodiments, the system breaks down not only who a character is through movement, but also how a character acts and interacts with different characters. For example, a character may interact differently with their spouse versus the way they may interact with their father versus the way they may interact with their child. Given this, in addition to understanding how a character acts through nonverbal communication overall, the system also may include an understanding of how the characters interact with one another through interactions and gestures.

In some embodiments, this may be expanded to support character arcs throughout a story. For example, at the beginning of story a character may be introverted and shy and by the end, the character may have found confidence and be outgoing. In another example, gestures at the beginning may be muted and by the end may be bigger and more animated. In this way, the system may include different arrays of a particular emotion throughout the story. For example, a Keith-Joy (husband, father, and son) relationship at beginning may be different than a Keith-Joy relationship at the end, with the Keith-Joy arrays including the addition and/or subtraction of gestures, posture changes (e.g., using different poses, dial-in strength levels, etc.), differing strength levels of the same gesture (e.g., 0.5 small, 0.75 medium, 1.0 large, etc.). Expanding on this example, Keith-Joy when with Barbara (Keith's mother) vs. Keith-Joy when with Brandy (wife, mother, and daughter-in-law), Keith-Joy with Levi (son and grandson) at the beginning of game with Levi versus Keith-Joy in middle of game with Levi, versus Keith-Joy with Levi at end of the game, etc. Thus, the system can drive and or follow conversational and narrative pacing, which in turn can control/drive mood and performance of characters.

In embodiments where the system includes an emotion system, the character's mood may be reflected in the body posture, and its position relative to the player and even the environment. In this way, the system may adjust the player's explore behavior based on mood. Given this, the system may unify implementations for all subsystems, and designers may set mood/emotion parameters for characters, and subsystems may switch their behaviors at the earliest possible/convenient moment.

In some embodiments, the system uses animation overlays that the user may use to create the characteristics (e.g., the personality) of a character by building layer upon layer of assets. For example, the user may layer custom animation overlays for subtle posture changes, move performances, follow settings, lead settings, explore pose selector, gesture arrays, eye noise patterns, or other types of assets.

To summarize, the core model module 1230 receives contextual information 1305 and provides it to various layers to select behavioral assets to use as well as the intensities/blend of those assets to enable dynamic, organic performances of the character in response to internal and external stimuli, or no stimuli at all. For example, if a character is spoken to by the user or another character, the character should respond. Similarly, if major events (e.g., an explosion, another character entering or leaving the scene, key information being revealed, etc.) occur within a threshold distance of the character, a response is generated. As another example, the character may automatically and autonomously dance to music that is playing in either the virtual environment or the real-world environment around the computer (e.g., as detected by a microphone). In each case, the nature of the character's response is governed by the contextual information 1305, such as an archetype, demographic information, a mood, and a relationship with the speaker of the character as well as the nature of the environment, enabling nuanced, context rich, dynamic performances.

The response can include triggering one or more of a wide range of assets, such as specific dialogue choices, changing heart rates, changing emotional state, starting or stopping pacing, changing pose, making a gesture, and the like. The specific assets chosen may be randomly selected from a set of suitable assets that the core model identifies from the contextual information.

In one embodiment, the contextual information 1305 provided as input to one or more layers of the character model includes an external stimulus (potentially in conjunction with other inputs, such as a current emotional state, environmental conditions, proximity of other characters, and the like). The core model module 1230 identifies one or more assets that may be triggered in response to the external stimulus (e.g., by querying the behavior asset datastore 280 for assets with tags derived from the contextual information 1305). The assets may be assigned corresponding probabilities of triggering (e.g., based on the attributes of the character) and the core model module 1230 selects one or more of the assets to trigger. For example, a random number generator may be used to determine which of a set of possible assets trigger and/or whether each asset is triggered may be determined independently using the random number generator and any triggered assets blended to produce a nuanced performance.

The character's response may include updating the character's behavioral model. It should also be appreciated that the core model module 1230 may determine how the character behaves in response to there being no external stimulus (e.g., if the character is in an "idle" state).

The response module 1240 generates a visualization of the character's response to the external stimulus using the triggered assets. For example, if the character is surprised by a sudden gunshot, animation assets causing the character's eyes to widen, their head turn towards the sound, and their body to jump in shock, with the intensity and other specifics of these reactions being determined by the attributes of the character (e.g., an older person may react more slowly and stiffly than a younger person, while a heroic character may more quickly recover and move towards the sound to investigate while a scared character might look for a place to hide, etc.). The response module 1240 may also generate corresponding audio to complement the visualization, such as a line of dialogue or an audible gasp, etc.

The evolution module 1250 determines how interactions between the character and the environment affect the character and thus update the character model. The evolution module 1250 updates the character model at run time (i.e., not as part of the development of the character). In one embodiment, the evolution module 1250 updates the values of attributes for characters according to a script or in response to events involving the character. For example, in a game, the confidence attribute of the character may start low and increase as the story progresses in a predetermined manner, with increases in confidence being triggered by scripted events at certain points in the game. As another example, the confidence level of the character may be updated dynamically as the character experiences successes or failures during gameplay.

In various embodiments, the system can easily be integrated into other projects and assets can be retargeted to other skeletons. The system can be multi-tiered, with users defining how deep they want the system to go; base level to hyper granular. Different styles of assets can be run by the same animation system (e.g., realistic, cartoony, synthetic, etc.). Assets can be added/subtracted by users as needed. Depending how far away from the camera a character is, the character animation modeling system can be made more or less granular dynamically.

Example Use Cases and Features

The following use cases and features are provided by way of example only. The use cases and features are described to illustrate the broad range of applicability of the techniques described in this disclosure for providing characters with dynamic interactive behavior.

Interactive Performances of Characters

The system may collect both verbal and nonverbal communication examples along with vocal emotive performances from any video source of individuals/characters as source material. Once the collected data is captured and categorized, generative adversarial neural networks (GANS) can be used to create a character model for a character. This character mode may then be driven by the layered animation system to recreate realistic behaviors in new contexts. The system may then be used to generate emotional interactive performances of characters in real time.

Narrative Styles

A character model may also be used to provide individualized narrative styles and pacing. For example, based on a conversation type, sequence of events, level, and position in a story, specific tagged elements can be triggered. For example, an introverted character's nonverbal communication while in a "joy" state may initially be muted but become more extravagant towards the end of the story when they become more outgoing. This can automatically provide indications of character development in how the character interacts with their environment without the need for a designer to manually define each reaction.

The character model may also be used to dynamically determine how a character communicates, both verbally and nonverbally. In one embodiment, based on the parameters of the character model, specific communication assets are made available or unavailable. For example, a character who is supposed to be 18 years old is going to communicate far differently both verbally and nonverbally than a 35 or a 70 year old character. Assets such as gestures and word choices may be tagged with age ranges. Each age range may have a binary tag indicating whether the asset is available for that age range and/or a probability that characters in that age range will use the asset. Thus, an older character may use some communication assets that are typically used by younger people, increasing the realism of interactions as characters may have their own idiosyncrasies rather than being caricatures of their demographic groupings.

As another example, an introverted character may use some high-energy communication gestures, but using the blending techniques disclosed herein, those gestures may be performed at a lower energy level than if performed by an extroverted individual. In one embodiment, the energy level at which a gesture is performed is a combination of the energy levels of the gesture and the character (e.g., if the gesture and character energy levels are percentages, the performance energy level may be determined by multiplying one by the other). Alternatively, activation of high energy gestures may only occur if a current energy level of the character exceeds a threshold, which may be set differently for different characters. For example, an extroverted character might trigger high-energy gestures with an energy level of 40% or above while an introverted character might only trigger the same gestures with an energy level of 80% or higher.

Domain Specific Characters

The system may be used to provide domain specific characters that are tailored to perform a specific task. For example, in one embodiment, a user can have a digital assistant to serve as a chemistry teacher. The digital assistant may be created by layering a common character base type with an educator domain class, with chemistry as the subject domain. Each layer adds specific tendencies and behavioral assets that may be triggered by blending the contributions of each layer. Thus, each user's digital assistant may be unique and personalized, but generated from a static set of base assets without individualized programming.

Metaverse

The techniques disclosed above can be used to generate interactive metaverse experiences. In one embodiment, the system may create emotional assets accessible for building and supporting digital identities and expressiveness to meet the demand for fully custom avatars from an emotional level. For example, the system may build on base locomotion animations to create custom locomotion models for avatars. A user may have significant freedom to create custom characters with scalable personalities and behavior for use in metaverse locations as well as games and other virtual environments.

In one embodiment, a graphical user interface (GUI) is provided in an online environment (e.g., the Sandbox, Decentraland, or Epic Games) that rides on top of the basic animation system. Thus, a user can set custom moods, personalities, and gestures. A zone system may also be sold or otherwise provided that enables users to define a space within the virtual environment in which avatars that enter automatically have their mood altered resulting in corresponding behavioral changes of those avatars.

In some embodiments, a user's digital wallet and/or NFTs can unlock specific emotions, gestures, dance moves, interactions, or the like enabling more nuanced interactions in the virtual environment in an organic way. These assets may then be transferred seamlessly between different virtual worlds.

Example Methods

Figure 29:
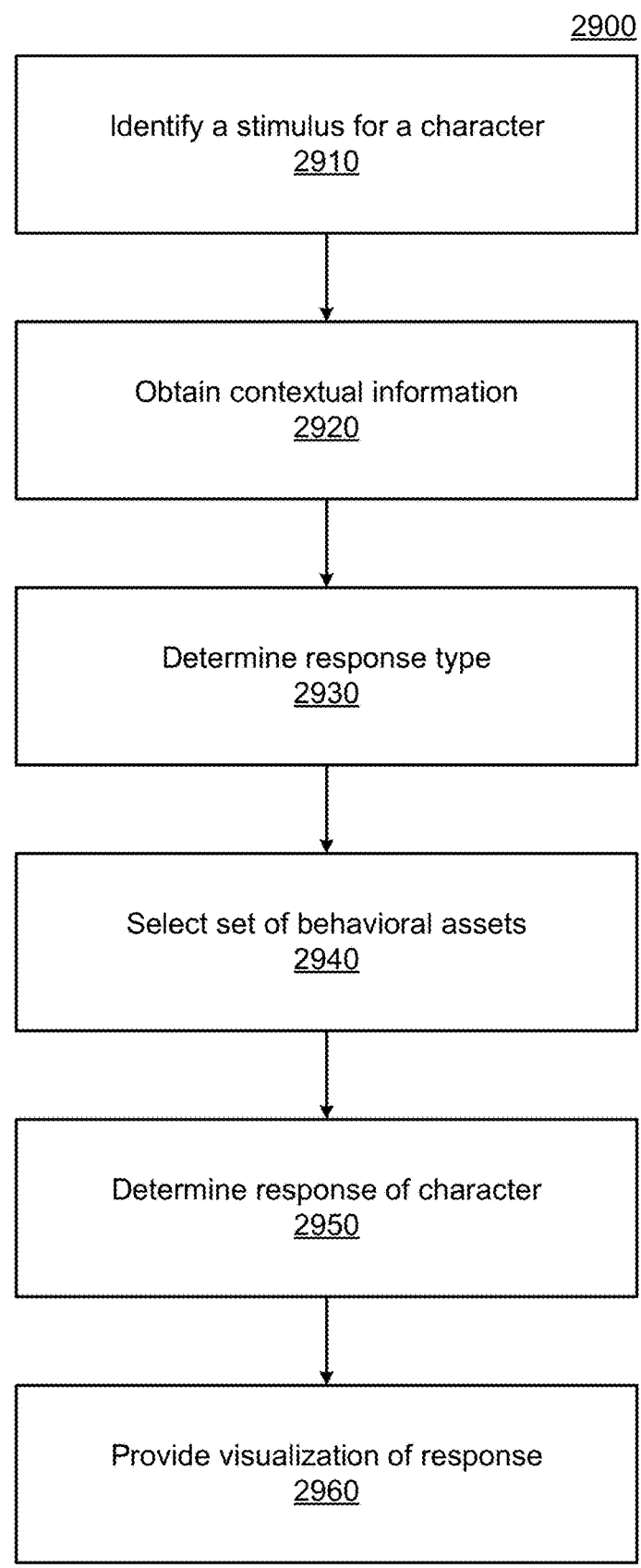
FIG. 29 is a flowchart illustrating a method for providing a dynamic response to an external stimulus by a character, according to one embodiment.

FIG. 29 illustrates a method 2900 for determining dynamic response of characters to stimuli, according to one embodiment. The steps of FIG. 29 are illustrated from the perspective of the virtual experience system 110 performing the method 2900. However, some or all of the steps may be performed by other entities or components. In addition, some embodiments may perform the steps in parallel, perform the steps in different orders, or perform different steps.

In the embodiment shown, the method 2900 begins with the virtual experience system 110 identifying 2910 a stimulus for a character and obtaining 2920 contextual information associated with the character. The stimulus may be external (e.g., an explosion, another character speaking to the character, the user speaking to the character, or any other external event) or internal (e.g., the character having a new idea or experiencing a shift in mood, etc.). The contextual information may include a wide range of information about the character and their environment, such as aspects of the character's personality, demographic information of the character, noise levels (and types of noise) in the environment, lighting levels in the environment, time of day, other characters in proximity to the character etc.

The virtual experience system 110 determines 2930 a response type for the character in response to the stimulus. The response type may be determined 2930 by rules, application of AI, or a combination of both. The virtual experience system 110 selects 2940 a set of behavioral assets based on the determined response type. As described previously, the set of assets may be selected by applying the response type and contextual information as input to the layers of the core model, which outputs suitable behavioral assets for the character in the current situation.

The virtual experience system 110 determines 2950 a response to the character to the stimulus by triggering one or more assets in the set. Where more than one asset is triggered, the assets are combined/blended to generate a nuanced, organic response. The virtual experience system 110 provides 2960 a visualization of the response for display to the user. For example, an animation of the character reacting to the stimulus may be rendered within a game or video. The reaction may be generated dynamically in real time, enabling varied and believable performances from characters that react to the environment around them.

Example Computing System

Figure 30:
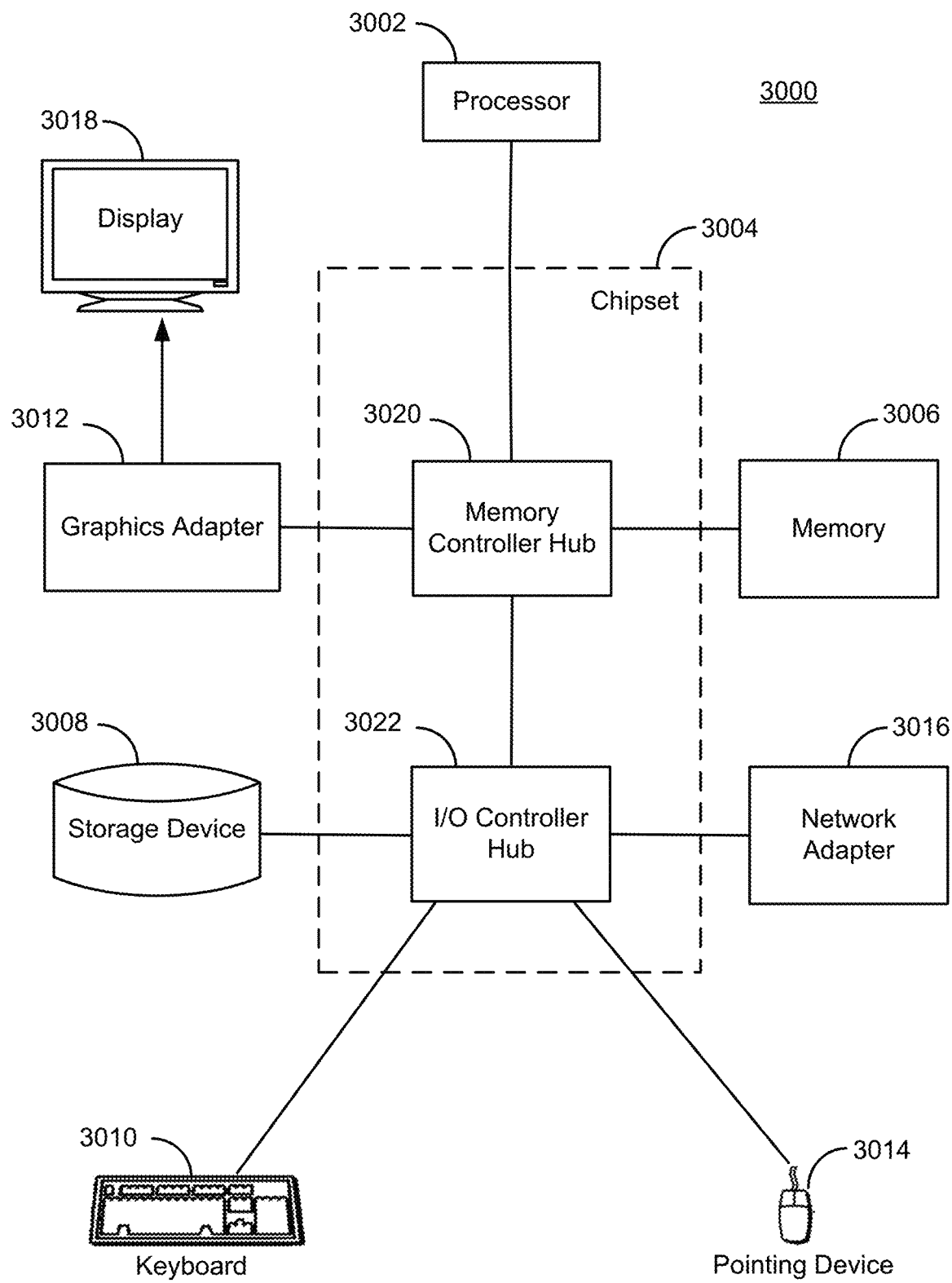
FIG. 30 is a block diagram illustrating an example computer system suitable for use in the networked computing environment of FIG. 1, according to one embodiment.

FIG. 30 is a block diagram of an example computer 3000 suitable for use as a virtual experience system 110, developer system 120, or client device 140. The example computer 3000 includes at least one processor 3002 coupled to a chipset 3004. The chipset 3004 includes a memory controller hub 3020 and an input/output (I/O) controller hub 3022. A memory 3006 and a graphics adapter 3012 are coupled to the memory controller hub 3020, and a display 3018 is coupled to the graphics adapter 3012. A storage device 3008, keyboard 3010, pointing device 3014, and network adapter 3016 are coupled to the I/O controller hub 3022. Other embodiments of the computer 3000 have different architectures.

In the embodiment shown in FIG. 30, the storage device 3008 is a non-transitory computer-readable storage medium such as a hard drive, compact disk read-only memory (CD-ROM), DVD, or a solid-state memory device. The memory 3006 holds instructions and data used by the processor 3002. The pointing device 3014 is a mouse, track ball, touch-screen, or other type of pointing device, and may be used in combination with the keyboard 3010 (which may be an on-screen keyboard) to input data into the computer system 3000. The graphics adapter 3012 displays images and other information on the display 3018. The network adapter 3016 couples the computer system 3000 to one or more computer networks, such as network 170.

The types of computers used by various parts of the system can vary depending upon the embodiment and the processing power required. For example, the virtual experience system 110 might include multiple blade servers working together to provide the functionality described. Furthermore, the computers can lack some of the components described above, such as keyboards 3010, graphics adapters 3012, and displays 3018.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing dynamic interactivity to characters. Thus, while particular embodiments and applications have been illustrated and described, it is to be understood that the described subject matter is not limited to the precise construction and components disclosed. The scope of protection should be limited only by the following claims.

What is claimed is:

1. A method of providing dynamic responses of characters to stimuli, the method comprising:
   identifying a stimulus for a character;
   obtaining contextual information associated with the character, wherein obtaining the contextual information associated with the character includes obtaining information about a current environment of the character, the information about the current environment of the character comprising an identity of an additional character in the environment and a relationship between the character and the additional character;
   determining a response type of the character to the stimulus;
   selecting a set of behavioral assets by applying, as input to a plurality of layers, input data derived from the response type and the contextual information;
   determining a response of the character to the stimulus by combining at least some of the behavioral assets; and
   providing a visualization of the response of the character to the stimulus for display to a user.

2. The method of claim 1, wherein obtaining contextual information associated with the character comprises obtaining a character model including attributes of the character.

3. The method of claim 2, wherein the attributes of the character includes a current energy level, and the behavioral assets in the set are selected based on the current energy level.

4. The method of claim 1, wherein the stimulus includes at least one of: a message, a line of dialogue, a virtual event, a real-world event, an action of another character, an action of a real person, music, a sound effect, or an object perceived by the character.

5. The method of claim 1, wherein the plurality of layers comprises at least one of: an idle layer, a breathing layer, a weight shift layer, a posture layer, a gestures layer, a performances layer, a look-ats layer, an interrupts layer, or a refusing layer.

6. The method of claim 1, wherein determining the response comprises:
   selecting a subset of the set of behavioral assets to trigger in response to the stimulus; and
   blending the subset of assets.

7. The method of claim 6, wherein each set of behavioral assets is associated with a corresponding probability of the behavioral asset triggering, and the subset is selected using a random number generator and the corresponding probabilities.

8. The method of claim 7, wherein the probability is based on at least one of: a suitability of the behavioral asset for the character or a degree to which the character is experiencing a corresponding emotion.

9. The method of claim 1, wherein the stimulus is music and the response is the character automatically performing one or more dance steps in time with the music.

10. The method of claim 1, wherein the response includes a gesture and an amplitude of the gesture or action is modified by a degree of extroversion of the character.

11. The method of claim 1, wherein the response includes a gesture and an amplitude of the gesture is modified by a current mood of the character.

12. The method of claim 1, wherein the response includes a gesture and an amplitude of the gesture is modified by an energy level of the character.

13. The method of claim 1, wherein the character is a digital being, a virtual being, a synthetic being, or a robotic being.

14. A method of providing dynamic responses of characters to stimuli, the method comprising:
   identifying a stimulus for a character;
   obtaining contextual information associated with the character;
   determining a response type of the character to the stimulus;
   selecting a set of behavioral assets by applying, as input to a plurality of layers, input data derived from the response type and the contextual information, wherein the plurality of layers comprises at least one of: an idle layer, a breathing layer, a weight shift layer, a posture layer, a gestures layer, a performances layer, a look-ats layer, an interrupts layer, or a refusing layer, and wherein the input data for at least one layer of the plurality of layers comprises demographic information for the character, and the at least one layer outputs one or more assets tagged as suitable for use with the character in view of the demographic information;
   determining a response of the character to the stimulus by combining at least some of the behavioral assets; and
   providing a visualization of the response of the character to the stimulus for display to a user.

15. The method of claim 14, wherein obtaining the contextual information associated with the character includes obtaining information about a current environment of the character, the information about the current environment of the character comprising an identity of an additional character in the environment and a relationship between the character and the additional character.

16. A method of providing dynamic responses of characters to stimuli, the method comprising:
   identifying a stimulus for a character;
   obtaining contextual information associated with the character;
   determining a response type of the character to the stimulus;
   selecting a set of behavioral assets by applying, as input to a plurality of layers, input data derived from the response type and the contextual information, wherein a first asset is included in the set responsive to a value of a first attribute of the character exceeding a threshold;
   determining a response of the character to the stimulus by combining at least some of the behavioral assets; and
   providing a visualization of the response of the character to the stimulus for display to a user.

17. The method of claim 16, wherein the threshold is adjusted by a random variation prior to comparing the value of the first attribute to the threshold.

18. The method of claim 16, wherein obtaining the contextual information associated with the character includes obtaining information about a current environment of the character, the information about the current environment of the character comprising an identity of an additional character in the environment and a relationship between the character and the additional character.

19. A method of providing dynamic responses of characters to stimuli, the method comprising:
   identifying a stimulus for a character;
   obtaining contextual information associated with the character;
   determining a response type of the character to the stimulus;

selecting a set of behavioral assets by applying, as input to a plurality of layers, input data derived from the response type and the contextual information;

determining a response of the character to the stimulus by combining at least some of the behavioral assets, wherein the response is determined using a natural language processing model that relates words to quick gestures, phrases to longer gestures, and sentences to pose changes; and providing a visualization of the response of the character to the stimulus for display to a user.

20. The method of claim 19, wherein obtaining the contextual information associated with the character includes obtaining information about a current environment of the character, the information about the current environment of the character comprising an identity of an additional character in the environment and a relationship between the character and the additional character.

* * * * *